US011893945B2

(12) United States Patent
Yoo et al.

(10) Patent No.: US 11,893,945 B2
(45) Date of Patent: *Feb. 6, 2024

(54) DISPLAY DEVICE AND ELECTRONIC DEVICE INCLUDING THE SAME

(71) Applicant: LG Display Co., Ltd., Seoul (KR)

(72) Inventors: Seung Jin Yoo, Paju-si (KR); Hyun Gi Hong, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/989,652

(22) Filed: Nov. 17, 2022

(65) Prior Publication Data

US 2023/0079387 A1 Mar. 16, 2023

Related U.S. Application Data

(63) Continuation of application No. 17/372,307, filed on Jul. 9, 2021, now Pat. No. 11,574,602.

(30) Foreign Application Priority Data

Aug. 25, 2020 (KR) ........................ 10-2020-0107184

(51) Int. Cl.
*G09G 3/3275* (2016.01)
*G09G 3/20* (2006.01)

(52) U.S. Cl.
CPC ......... *G09G 3/3275* (2013.01); *G09G 3/2007* (2013.01); *G09G 2300/0452* (2013.01);
(Continued)

(58) Field of Classification Search
CPC ... G09G 2300/0426; G09G 2300/0452; G09G 2300/0814; G09G 2300/0819;
(Continued)

(56) References Cited

U.S. PATENT DOCUMENTS 10,290,258 B2 5/2019 Park et al.
10,360,856 B2 7/2019 Oh et al.
(Continued)

FOREIGN PATENT DOCUMENTS

CN 106683620 A 5/2017
CN 107342053 A 11/2017
(Continued)

OTHER PUBLICATIONS

United States Office Action, U.S. Appl. No. 17/372,307, dated Jun. 23, 2022, 11 pages.
(Continued)

*Primary Examiner* — Kenneth Bukowski
(74) *Attorney, Agent, or Firm* — Fenwick & West LLP

(57) ABSTRACT

The display device includes a first data line group including data lines connected to pixels arranged at a first resolution; a second data line group including data lines connected to pixels arranged at the first resolution and pixels arranged at a second resolution; a first gamma compensation voltage generation unit that divides a first reference voltage and outputs a gamma compensation voltage; a second gamma compensation voltage generation unit that divides a second reference voltage and outputs gamma compensation voltages; a first data drive unit that converts pixel data into the gamma compensation voltage output from the first gamma compensation voltage generation unit and outputs a data voltage to the first data line group; and a second data drive unit that converts pixel data into the gamma compensation voltage output from the second gamma compensation voltage generation unit and outputs a data voltage to the second data line group.

19 Claims, 30 Drawing Sheets

(52) U.S. Cl.
CPC . *G09G 2310/0291* (2013.01); *G09G 2310/08* (2013.01); *G09G 2320/0673* (2013.01); *G09G 2330/028* (2013.01)

(58) Field of Classification Search
CPC ....... G09G 2310/0291; G09G 2310/08; G09G 2320/045; G09G 2320/0673; G09G 2330/028; G09G 2360/144; G09G 3/2007; G09G 3/3258; G09G 3/3275
See application file for complete search history.

(56) References Cited

U.S. PATENT DOCUMENTS

| | | | | |
|---|---|---|---|---|
| 11,037,523 | B2 | 6/2021 | Hei et al. | |
| 11,410,613 | B2 | 8/2022 | Lee et al. | |
| 2016/0049113 | A1* | 2/2016 | Park | G09G 3/3208<br>345/212 |
| 2016/0118000 | A1* | 4/2016 | Kim | G09G 3/3696<br>345/99 |
| 2017/0132975 | A1 | 5/2017 | Park et al. | |
| 2017/0316744 | A1 | 11/2017 | Oh et al. | |
| 2020/0135147 | A1 | 4/2020 | Tang et al. | |
| 2020/0152134 | A1* | 5/2020 | Lee | G09G 3/20 |
| 2020/0234634 | A1 | 7/2020 | Li | |
| 2020/0279534 | A1 | 9/2020 | Ji et al. | |
| 2021/0134242 | A1 | 5/2021 | Hei et al. | |
| 2021/0272505 | A1* | 9/2021 | Kim | G09G 3/2092 |
| 2022/0139336 | A1 | 5/2022 | Jeon et al. | |
| 2022/0343863 | A1 | 10/2022 | Lee et al. | |

FOREIGN PATENT DOCUMENTS

| | | | |
|---|---|---|---|
| CN | 110767147 | A | 2/2020 |
| CN | 111179798 | A | 5/2020 |

OTHER PUBLICATIONS

China National Intellectual Property Administration, Office Action, Chinese Patent Application No. 202110806552.1, dated Nov. 21, 2023, 15 pages.

* cited by examiner (Pixel OFF)

DISPLAY DEVICE AND ELECTRONIC DEVICE INCLUDING THE SAME

CROSS-REFERENCE TO RELATED APPLICATION

This application is a continuation application of U.S. patent application Ser. No. 17/372,307 filed on Jul. 9, 2021, which claims priority to and the benefit of Korean Patent Application No. 10-2020-0107184 filed on Aug. 25, 2020, all of which are incorporated herein by reference in their entirety.

BACKGROUND

1. Technical Field

The present disclosure relates to a display device and an electronic device including the same.

2. Discussion of Related Art

Electroluminescent display devices are roughly classified into inorganic light emitting display devices and organic light emitting display devices depending on materials of light emitting layers. Active matrix type organic light emitting display devices include organic light emitting diodes (hereinafter, referred to as "OLEDs") that are self-luminescent, and advantageously have a high response speed, a high luminous efficiency, a high luminance, and a wide viewing angle. In the organic light emitting display devices, an OLED is formed in each pixel. The organic light emitting display devices have a high response speed, an excellent luminous efficiency, an excellent luminance, and an excellent viewing angle as well as excellent contrast ratio and color reproducibility because black gray scale may be expressed as complete black.

Multimedia functions of mobile devices are being improved. For example, cameras are basically built into smartphones, and the resolution of the cameras trends is increasing to a level of a conventional digital camera. However, front cameras of the smart phone restrict screen designs, making it difficult to design the screen. In order to reduce spaces occupied by the cameras, screen designs including notches or punch holes have been adopted in the smartphones. However, screen sizes are still limited due to the cameras, and thus full-screen displays cannot be implemented.

In order to implement the full-screen displays, a method has been proposed in which a sensing area in which low-resolution pixels are arranged in a screen of a display panel is provided and a camera is arranged at a position facing the sensing area below the display panel. The sensing area in the screen is operated as a transparent display for displaying an image. Such a sensing area has low transmittance and low luminance due to the pixels.

Optical compensation for each area is required to improve a brightness difference and a color difference between the low-resolution pixels and high-resolution pixels. The optical compensation for each area is to fix an analog gamma and to be corrected with a digital gamma. The analog gamma should be set high based on a sensing area that requires a high drive voltage, but loss of actual drive data bits in a display area occurs. A method capable of gamma correction in all areas only using the analog gamma is required.

SUMMARY OF THE INVENTION

The present disclosure is directed to solving all the above-described necessity and problems.

The present disclosure provides a display device, which may uniformize the image quality of a full-screen display having a sensing area, and an electronic device including the same.

It should be noted that objects of the present disclosure are not limited to the above-described objects, and other objects of the present disclosure will be apparent to those skilled in the art from the following descriptions.

A display device according to the present disclosure includes: a first data line group including data lines connected to pixels arranged at a first resolution in a first area of a screen; a second data line group including the data lines connected to pixels arranged at the first resolution and pixels arranged at a second resolution lower than the first resolution in a second area of the screen; a first gamma compensation voltage generation unit that divides a first reference voltage and outputs a gamma compensation voltage; a second gamma compensation voltage generation unit that divides a second reference voltage and outputs gamma compensation voltages that are different according to each resolution; a first data drive unit that converts pixel data, which is to be written in the pixels of the first area, into the gamma compensation voltage output from the first gamma compensation voltage generation unit and outputs a data voltage to the data lines of the first data line group; and a second data drive unit that converts pixel data, which is to be written in the pixels of the second area, into the gamma compensation voltage output from the second gamma compensation voltage generation unit and outputs a data voltage to the data lines of the second data line group.

According to the present disclosure, the image quality of a full-screen display having a sensing area can be uniformized.

According to the present disclosure, an individual analog gamma reference voltage can be set in the sensing area, and accordingly, all areas can be driven without loss of data bits.

According to the present disclosure, since an analog gamma reference signal varies in a boundary portion between a display area and the sensing area according to a scanning time, the boundary portion can be additionally compensated for.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
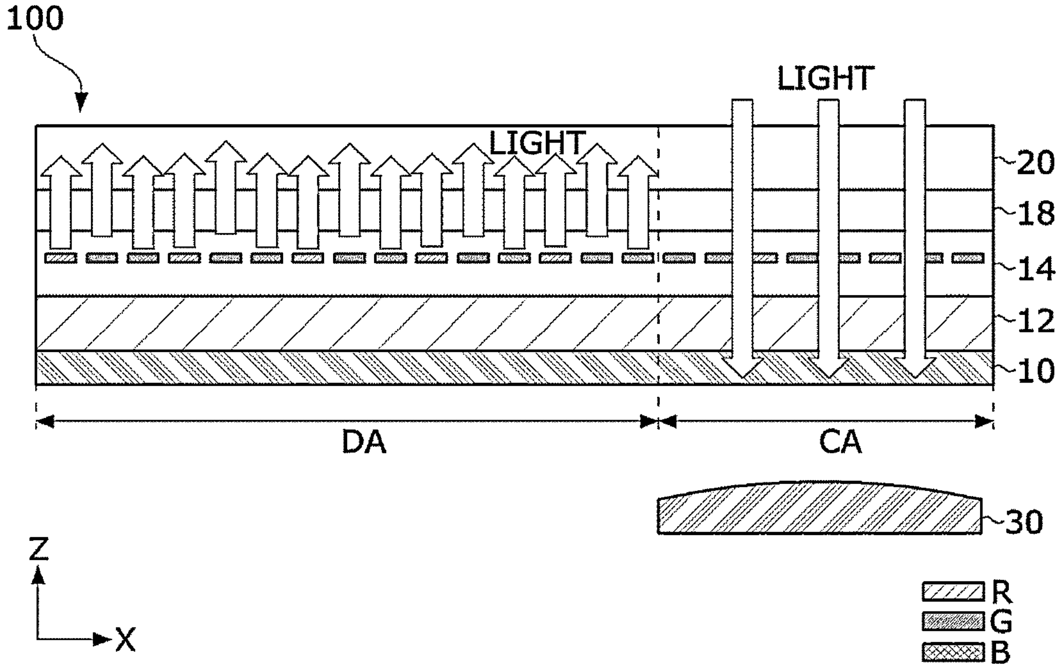
FIG. 1 is a sectional view schematically illustrating a display panel according to an embodiment of the present disclosure.

The advantages and features of the present disclosure and methods for accomplishing the same will be more clearly understood from embodiments described below with reference to the accompanying drawings. However, the present disclosure is not limited to the following embodiments but may be implemented in various different forms. Rather, the present embodiments will make the disclosure of the present disclosure complete and allow those skilled in the art to completely comprehend the scope of the present disclosure. The present disclosure is only defined within the scope of the accompanying claims.

The shapes, sizes, ratios, angles, numbers, and the like illustrated in the accompanying drawings for describing the embodiments of the present disclosure are merely examples, and the present disclosure is not limited thereto. Like reference numerals generally denote like elements throughout the present specification. Further, in describing the present disclosure, detailed descriptions of known related technologies may be omitted to avoid unnecessarily obscuring the subject matter of the present disclosure.

The terms such as "comprising," "including," "having," and "consist of" used herein are generally intended to allow other components to be added unless the terms are used with the term "only." Any references to singular may include plural unless expressly stated otherwise.

Components are interpreted to include an ordinary error range even if not expressly stated.

When the position relation between two components is described using the terms such as "on," "above," "below," and "next," one or more components may be positioned between the two components unless the terms are used with the term "immediately" or "directly."

The terms "first," "second," and the like may be used to distinguish components from each other, but the functions or structures of the components are not limited by ordinal numbers or component names in front of the components.

The following embodiments can be partially or entirely bonded to or combined with each other and can be linked and operated in technically various ways. The embodiments can be carried out independently of or in association with each other.

Hereinafter, various embodiments of the present disclosure will be described in detail with reference to the accompanying drawings.

In embodiments, a novel scheme is proposed in which a screen is classified into a first area including pixels arranged at a first resolution and a second area including pixels arranged at the first resolution and pixels arranged at a second resolution that is lower than the first resolution, a first gamma compensation voltage generated by dividing a first reference voltage is applied to the first area, and different second gamma compensation voltages generated by dividing a first voltage level and a second voltage level of a second reference voltage according to each resolution are applied to the second area.

In this case, when the first resolution is referred to as a high resolution, and the second resolution is referred to as a low resolution, an area in which pixels are arranged at the low resolution is named a sensing area. Here, the sensing area includes at least one of a first sensing area including a camera module and a second sensing area including a fingerprint recognition module, but the present disclosure is not limited thereto. Such a sensing area is an area designed to have a resolution lower than that of a display area.

Figure 2:
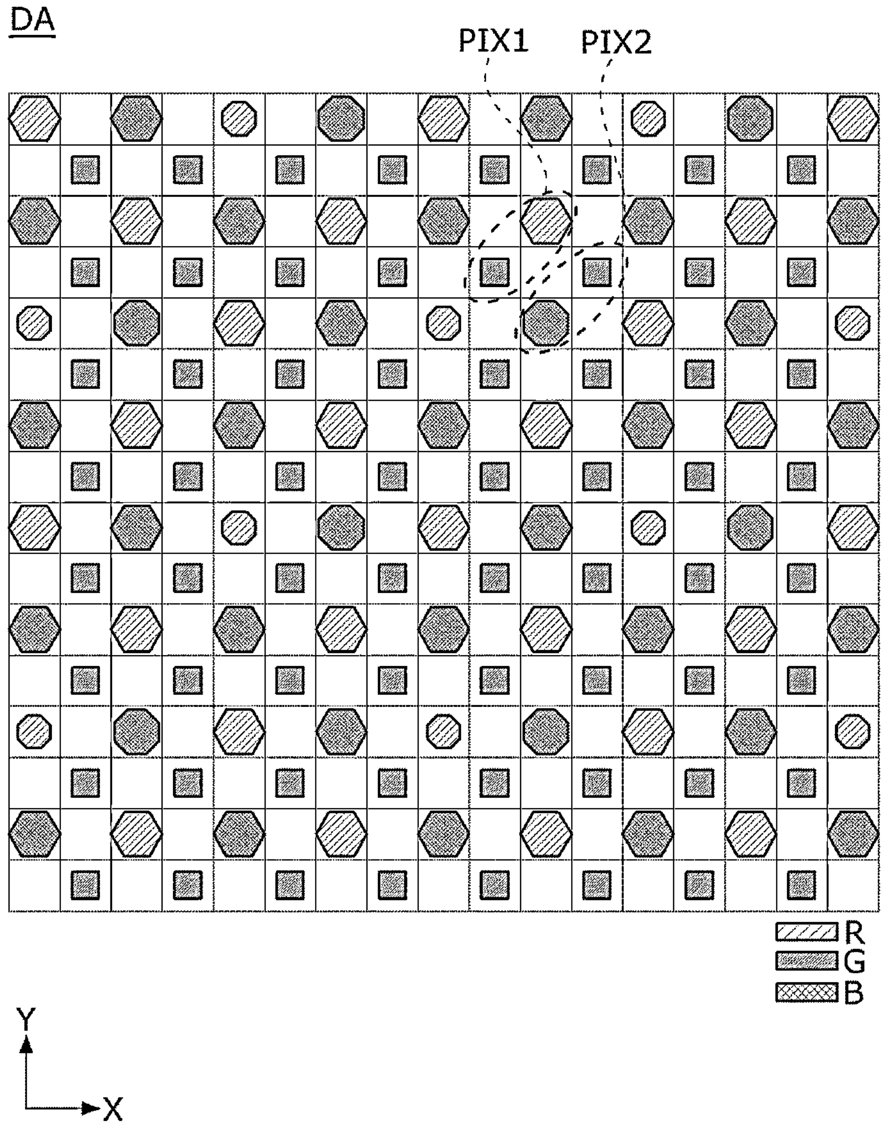
FIG. 2 is a view illustrating an example of pixel arrangement in a display area (DA)
Figure 3:
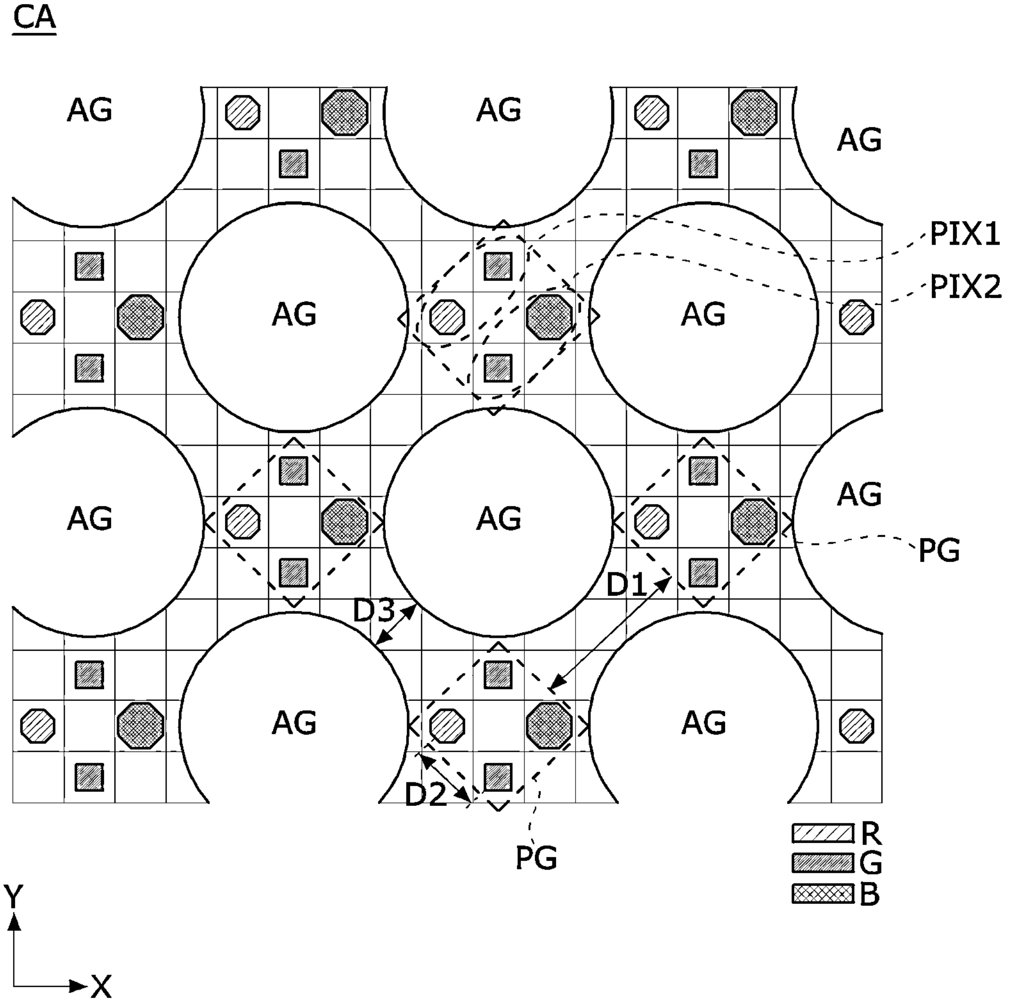
FIG. 3 is a view illustrating an example of a pixel and a light transmitting part in a first sensing area (CA)

FIG. 1 is a sectional view schematically illustrating a display panel according to an embodiment of the present disclosure, FIG. 2 is a view illustrating an example of pixel arrangement in a display area DA, and FIG. 3 is a view illustrating an example of a pixel and a light transmitting part in a first sensing area CA. In FIGS. 2 and 3, wiring connected to pixels is omitted.

Figure 9:
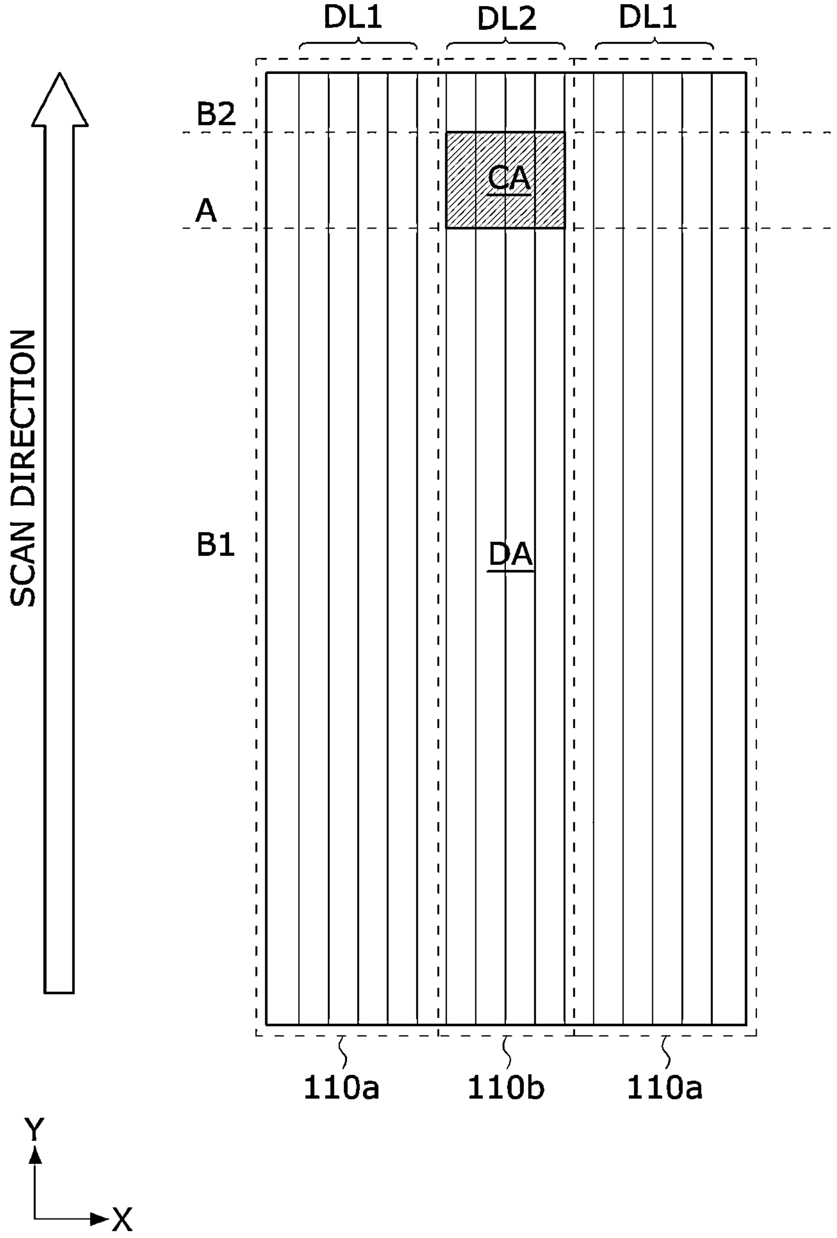
FIGS. 9, 10, 11A, 11B, and 12A to 12H are views illustrating examples in which a gamma reference voltage varies according to each area of the display panel.

Referring to FIGS. 1 and 2, a screen of a display panel 100 includes at least a display area DA in which pixels are arranged at a high resolution and a first sensing area CA in which pixels are arranged at a low resolution and is divided into a first area 110*a* including the pixels arranged at the high resolution and a second area 110*b* including the pixels arranged at the high resolution and the pixels arranged at the low resolution as shown in FIG. 9. Here, the area in which the pixels are arranged at the high resolution, that is, a high-resolution area, may include an area in which the pixels are arranged at a high pixels per inch (PPI), that is, a high PPI area, and the area in which the pixels are arranged at the low resolution, that is, a low-resolution area, may include an area in which the pixels are arranged at a low PPI, that is, a low PPI area.

The display area DA and the first sensing area include a pixel array in which pixels in which pixel data is written are arranged. The number of pixels per unit area, that is, the PPI, of the first sensing area CA is lower than the PPI of the display area DA in order to secure the transmittance of the first sensing area CA.

The pixel array of the display area DA includes a pixel area (first pixel area) in which a plurality of pixels having a high PPI are arranged. The pixel array of the first sensing area CA includes a pixel area (second pixel area) in which a plurality of pixel groups PG spaced by the light transmitting part and thus having a relatively low PPI are arranged. In the first sensing area CA, external light may pass through the display panel 100 through the light transmitting part having a high light transmittance and may be received by an imaging element module below the display panel 100.

Since the display area DA and the first sensing area CA include pixels, an input image is reproduced on the display area DA and the first sensing area CA.

Each of the pixels of the display area DA and the first sensing area CA include sub-pixels having different colors to realize the color of the image. Sub-pixels include a red sub-pixel (hereinafter, referred to as an "R sub-pixel"), a green sub-pixel (hereinafter, referred to as a "G sub-pixel"), and a blue sub-pixel (hereinafter, referred to as a "B sub-pixel"). Although not illustrated, each of pixels P may further include a white sub-pixel (hereinafter, a "W sub-pixel"). Each of the sub-pixels may include a pixel circuit and a light emitting element OLED.

The first sensing area CA includes the pixels and the imaging element module disposed below the screen of the display panel 100. A lens 30 of the imaging element module displays an input image by writing pixel data of the input image in the pixels of the first sensing area CA in a display mode. The imaging element module captures an external image in an imaging mode and outputs a picture or moving image data. The lens 30 of the imaging element module faces the first sensing area CA. The external light is incident on the lens 30 of the imaging element module, and the lens 30 collects the light in an image sensor that is omitted in the drawings. The imaging element module captures an external image in the imaging mode and outputs a picture or moving image data.

In order to secure the transmittance, an image quality compensation algorithm for compensating for the luminance and color coordinates of pixels in the first sensing area CA may be applied due to pixels removed from the first sensing area CA.

In the present disclosure, since the low-resolution pixels are arranged in the first sensing area CA, a display area of the screen is not limited in relation to the imaging element module, and thus a full-screen display can be implemented.

The display panel 100 has a width in an X-axis direction, a length in a Y-axis direction, and a thickness in a Z-axis direction. The display panel 100 includes a circuit layer 12 disposed on a substrate 10 and a light emitting element layer 14 disposed on the circuit layer 12. A polarizing plate 18 may be disposed on the light emitting element layer 14, and a cover glass 20 may be disposed on the polarizing plate 18.

The circuit layer 12 may include a pixel circuit connected to wirings such as data lines, gate lines, and power lines, a gate drive part connected to the gate lines, and the like. The circuit layer 12 may include circuit elements such as a transistor implemented as a thin film transistor (TFT) and a capacitor. The wirings and circuit elements of the circuit layer 12 may be formed of a plurality of insulating layers, two or more metal layers separated with the insulating layers therebetween, and an active layer including a semiconductor material.

The light emitting element layer 14 may include a light emitting element driven by the pixel circuit. The light emitting element may be implemented as an organic light emitting diode (OLED). The OLED includes an organic compound layer formed between an anode and a cathode. The organic compound layer may include a hole injection layer HIL, a hole transport layer HTL, an emission layer EML, an electron transport layer ETL, and an electron injection layer EIL, but the present disclosure is not limited thereto. When a voltage is applied to the anode and the cathode of the OLED, holes passing through the hole transport layer HTL and electrons passing through the electron transport layer ETL are moved to the emission layer EML to form excitons, and thus visible light is emitted from the emission layer EML. The light emitting element layer 14 may be disposed on pixels that selectively transmit light having red, green, and blue wavelengths and may further include a color filter array.

The light emitting element layer 14 may be covered with a protective film, and the protective film may be covered with an encapsulation layer. The protective layer and the encapsulation layer may have a structure in which an organic film and an inorganic film are alternately stacked. The inorganic film blocks permeation of moisture or oxygen. The organic film planarizes the surface of the inorganic film. When the organic film and the inorganic film are stacked in multiple layers, a movement path of the moisture or oxygen is longer than that of a single layer, and thus the permeation of the moisture/oxygen affecting the light emitting element layer 14 can be effectively blocked.

The polarizing plate 18 may adhere to the encapsulation layer. The polarizing plate 18 improves outdoor visibility of the display device. The polarizing plate 18 reduces an amount of light reflected from the surface of the display panel 100, blocks the light reflected from metal of the circuit layer 12, and thus improves the brightness of pixels. The polarizing plate 18 may be implemented as a linear polarizing plate and a phase delay film bonded to each other, or a circular polarizing plate.

In the display panel of the present disclosure, each pixel area of the display area DA and the first sensing area CA includes a light shielding layer. The light shielding layer is removed from the light transmitting part of the first sensing area to define the light transmitting part. The light shielding layer includes an opening hole corresponding to a light transmitting part area. The light shielding layer is removed from the opening hole. The light shielding layer is formed of a metal or inorganic film having a lower absorption coefficient than that of the metal removed from the light transmitting part with respect to the wavelength of a laser beam used in a laser ablation process of removing a metal layer present in the light transmitting part.

Referring to FIG. 2, the display area DA includes pixels PIX1 and PIX2 arranged in a matrix form. Each of the pixels PIX1 and PIX2 may be implemented as a real type pixel in which the R, G, and B sub-pixels of three primary colors are formed as one pixel. Each of the pixels PIX1 and PIX2 may further include the W sub-pixel that is omitted in the drawings. Further, two sub-pixels may be configured as one pixel using a sub-pixel rendering algorithm. For example, the first pixel PIX1 may be configured as R and G sub-pixels, and the second pixel PIX2 may be configured as B and G sub-pixels. Insufficient color representation in each of the pixels PIX1 and PIX2 may be compensated for by an average value of corresponding color data between adjacent pixels.

Referring to FIG. 3, the first sensing area CA includes pixel groups PG spaced apart from each other by a predetermined distance D1 and light transmitting parts AG arranged between the adjacent pixel groups PG. The external light is received by the lens 30 of the imaging element module through the light transmitting parts AG. The light transmitting parts AG may include transparent media having high transmittance without a metal so that light may be incident with minimum light loss. In other words, the light transmitting parts AG may be formed of transparent insulating materials without including metal lines or pixels. The transmittance of the first sensing area CA becomes higher as the light transmitting parts AG become larger.

The pixel group PG may include one or two pixels. Each of the pixels of the pixel group PG may include two to four sub-pixels. For example, one pixel in the pixel group PG may include R, G, and B sub-pixels or may include two sub-pixels and may further include a W sub-pixel. In an example of FIG. 3, the first pixel PIX1 is configured as R and G sub-pixels, and the second pixel PIX2 is configured as B and G sub-pixels, but the present disclosure is not limited thereto.

A distance D3 between the light transmitting parts AG is smaller than a distance D1 between the pixel groups PG. A distance D2 between the sub-pixels is smaller than the distance D1 between the pixel groups PG.

The shape of the light transmitting parts AG is illustrated as a circular shape in FIG. 3, but the present disclosure is not limited thereto. For example, the light transmitting parts AG may be designed in various shapes such as a circle, an ellipse, and a polygon. The light transmitting parts AG may be defined as areas in the screen from which all metal layers are removed.

Figure 4:
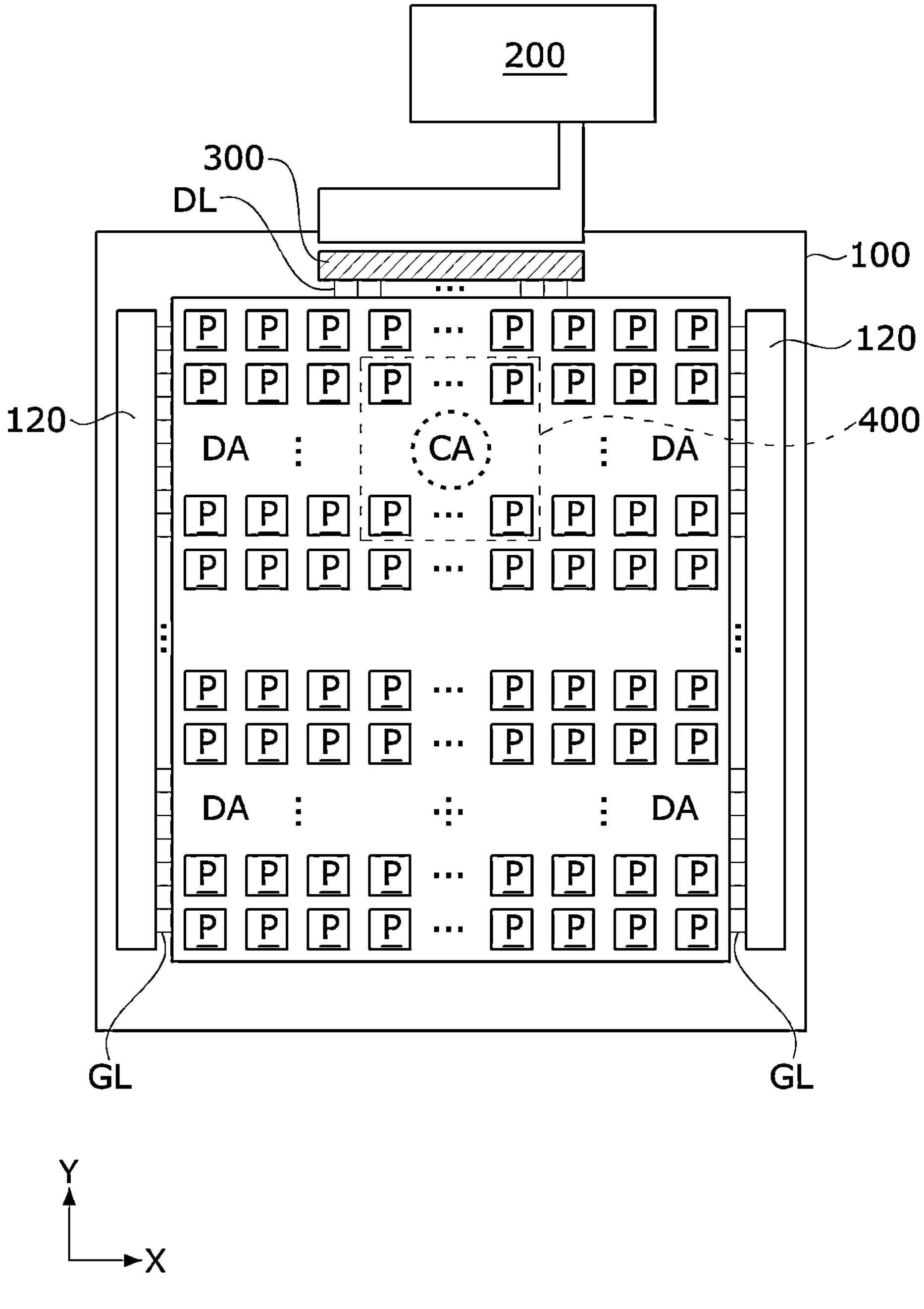
FIG. 4 is a view illustrating the entire configuration of a display device according to the embodiment of the present disclosure.
Figure 5:
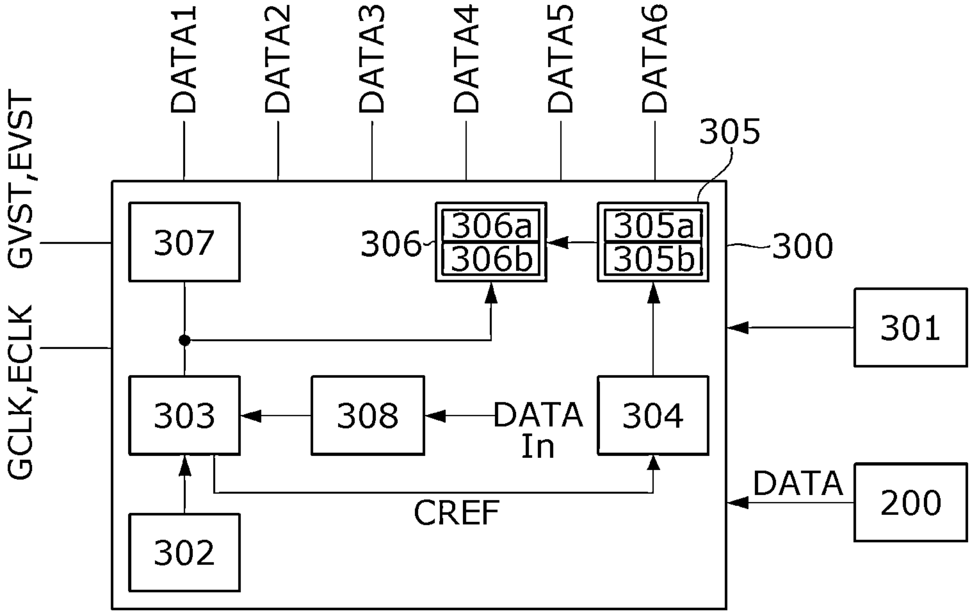
FIG. 5 is a view schematically illustrating a configuration of a drive integrated circuit (IC) illustrated in FIG. 4.

FIG. 4 is a view illustrating the entire configuration of a display device according to the embodiment of the present disclosure, and FIG. 5 is a view schematically illustrating a configuration of a drive integrated circuit (IC) illustrated in FIG. 4.

Referring to FIGS. 4 and 5, the display device includes the display panel 100 in which the pixel array is disposed on the screen, a display panel drive unit, and the like.

The pixel array of the display panel 100 includes data lines DL, gate lines GL intersecting the data lines DL, and pixels P defined by the data lines DL and the gate lines GL and arranged in a matrix form. The pixel array further includes power lines such as a VDD line PL1, a Vini line PL2, and a VSS line PL3 illustrated in FIGS. 6 and 7.

As illustrated in FIG. 1, the pixel array may be divided into the circuit layer 12 and the light emitting element layer 14. A touch sensor array may be disposed on the light emitting element layer 14. Each of the pixels of the pixel array may include two to four sub-pixels as described above. Each of the sub-pixels includes a pixel circuit disposed in the circuit layer 12.

The screen on which the input image is reproduced on the display panel 100 includes the display area DA and the first sensing area CA.

Sub-pixels of each of the display area DA and the first sensing area CA include pixel circuits. The pixel circuit may include a drive element that supplies a current to the light emitting element OLED, a plurality of switch elements that sample a threshold voltage of the drive element and switch a current path of the pixel circuit, a capacitor that maintains a gate voltage of the drive element, and the like. The pixel circuit is disposed below the light emitting element OLED.

The first sensing area CA includes the light transmitting parts AG arranged between the pixel groups PG and an imaging element module 400 disposed below the first sensing area CA. The imaging element module 400 photoelectrically converts light incident through the first sensing area CA in the imaging mode using the image sensor, converts the pixel data of the image output from the image sensor into digital data, and outputs the captured image data.

The display panel drive unit writes the pixel data of the input image to the pixels P. The pixels P may be interpreted as a pixel group PG including a plurality of sub-pixels.

The display panel drive unit includes a data drive unit 306, which supplies a data voltage of the pixel data to the data lines DL, and a gate drive unit 120 that sequentially supplies a gate pulse to the gate lines GL. The data drive unit 306 may be integrated in a drive IC 300. The display panel drive unit may further include a touch sensor drive unit that is omitted in the drawings.

The drive IC 300 may adhere to the display panel 100. The drive IC 300 receives pixel data of the input image and a timing signal from a host system 200, supplies a data voltage of the pixel data to the pixels, and synchronizes the data drive unit 306 and the gate drive unit 120.

The drive IC 300 is connected to the data lines DL through data output channels to supply the data voltage of the pixel data to the data lines DL. The drive IC 300 may output a gate timing signal for controlling the gate drive unit 120 through gate timing signal output channels. The gate timing signal generated from a timing controller 303 may include a gate start pulse VST, a gate shift clock CLK, and the like. The gate start pulse VST and the gate shift clock CLK swing between a gate-on voltage VGL and a gate-off voltage VGH. The gate timing signals VST and CLK output from a level shifter 307 are applied to the gate drive unit 120 to control a shift operation of the gate drive unit 120.

The gate drive unit 120 may include a shift register formed on the circuit layer of the display panel 100 together with the pixel array. The shift register of the gate drive unit 120 sequentially supplies a gate signal to the gate lines GL under control of the timing controller 303. The gate signal may include a scan pulse and an EM pulse of a light emission signal. The shift register may include a scan drive unit that outputs the scan pulse and an EM drive unit that outputs the EM pulse. In FIG. 5, GVST and GCLK are gate timing signals input to the scan drive unit. EVST and ECLK are gate timing signals input to the EM drive unit.

The drive IC 300 may be connected to the host system 200, a first memory 301, and the display panel 100. The drive IC 300 may include a data reception and calculation unit 308, the timing controller 303, the data drive unit 306, a gamma compensation voltage generation unit 305, a power supply unit 304, a second memory 302, and the like.

The data reception and calculation unit 308 includes a reception unit that receives the pixel data input as a digital signal from the host system 200, and a data calculation unit that processes the pixel data input through the reception unit to improve image quality. The data calculation unit may include a data decoding unit that decodes and restores compressed pixel data, an optical compensation unit that adds a preset optical compensation value to the pixel data, and the like. The optical compensation value may be set as a value for correcting the luminance of each pixel data on the basis of the luminance of the screen measured on the basis of a camera image captured in a manufacturing process.

The timing controller 303 provides, to the data drive unit 306, the pixel data of the input image received from the host system 200. The timing controller 303 generates a gate timing signal for controlling the gate drive unit 120 and a source timing signal for controlling the data drive unit 306 to control the operation timing of the gate drive unit 120 and the data drive unit 306.

The timing controller 303 according to the embodiment generates a reference voltage control signal CREF for controlling a reference voltage according to the PPI and provides the reference voltage control signal CREF to the power supply unit 304. Since the display area in which pixels are arranged at a high PPI and the first sensing area in which pixels are arranged at a low PPI are predefined, the timing controller 303 may control the reference voltage to be provided to the pixels arranged at the high PPI and the pixels arranged at the low PPI according to a scan direction while a scan is in progress.

For example, the second reference voltage varies between the first voltage level and the second voltage level. The timing controller 303 generates a first reference voltage control signal when the second reference voltage is changed from the first voltage level to the second voltage level and generates a second reference control signal when the second reference voltage is changed from the second voltage level to the first voltage level.

The power supply unit 304 generates, using a direct current (DC)-DC converter, power required for driving the pixel array of the display panel 100, the gate drive unit 120, and the drive IC 300. The DC-DC converter may include a charge pump, a regulator, a Buck converter, a boost converter, and the like. The power supply unit 304 may adjust a DC input voltage received from the host system 200 to generate a DC power such as the reference voltage, the gate-on voltage VGL, the gate-off voltage VGH, a pixel drive voltage VDD, a low-potential power supply voltage VSS, and an initialization voltage Vini. The reference voltage is supplied to the gamma compensation voltage generation unit 305. The reference voltage includes the first reference voltage and the second reference voltage. The first reference voltage is supplied to a first gamma compensation voltage generation unit 305*a*, and the second reference voltage is supplied to a second gamma compensation voltage generation unit 305*b*. The gate-on voltage VGL and the gate-off voltage VGH are supplied to the level shifter 307 and the gate drive unit 120. Pixel powers, such as the pixel drive voltage VDD, the low-potential power supply voltage VSS, and the initialization voltage Vini, are commonly supplied to the pixels P. The initialization voltage Vini is set to a DC voltage that is lower than the pixel drive voltage VDD and lower than a threshold voltage of the light emitting element OLED to initialize main nodes of the pixel circuits and suppress light emission of the light emitting element OLED.

The gamma compensation voltage generation unit 305 divides the reference voltage supplied from the power supply unit 304 through a divider circuit to generate a gray scale-specific gamma compensation voltage. The gamma compensation voltage is an analog voltage that is set for each gray scale of the pixel data. The gamma compensation voltage output from the gamma compensation voltage generation unit 305 is provided to the data drive unit 306.

The gamma compensation voltage generation unit 305 according to the embodiment includes the first gamma compensation voltage generation unit 305*a* and the second gamma compensation voltage generation unit 305*b*. The first gamma compensation voltage generation unit 305*a* receives the first reference voltage to generate the first gamma compensation voltage for each gray scale, and the second gamma compensation voltage generation unit 305*b* receives the second reference voltage to generate the second gamma compensation voltage for each gray scale.

In this case, since a second data line group includes data lines connected to the pixels arranged at the high PPI and the pixels arranged at the low PPI in the second area of the screen, the second gamma compensation voltage generation unit 305*b* divides the second reference voltage to generate the second gamma compensation voltages that are different according to each PPI. For example, the second gamma compensation voltage generation unit 305*b* divides the first voltage level of the second reference voltage at the high PPI in the second area to generate a 2-1st gamma compensation voltage and divides the second voltage level of the second reference voltage at the low PPI to generate a 2-2nd gamma compensation voltage.

The first gamma compensation voltage generation unit 305*a* and the second gamma compensation voltage generation unit 305*b* may be independently controlled.

The data drive unit 306 converts digital data including the pixel data received from the timing controller 303 into a gamma compensation voltage through a digital-to-analog converter (DAC) and outputs the data voltage. The data voltage output from the data drive unit 306 is supplied to the data lines DL of the pixel array through an output buffer connected to a data channel of the drive IC 300.

The data drive unit 306 according to the embodiment includes a first data drive unit 306*a* and a second data drive unit 306*b*. Each channel of the first data drive unit 306*a* and the second data drive unit 306*b* includes a DAC and an output buffer. The first data drive unit 306*a* converts, through the DAC, the digital data including the pixel data received from the timing controller 303 into the first gamma compensation voltage generated from the first gamma compensation voltage generation unit 305*a* and supplies the data voltage to a first data line group of the pixel array through the output buffer. While scanning the pixels arranged at the high PPI in the second area, the second data drive unit 306*b* supplies, to the second data line group of the pixel array through the output buffer, the data voltage obtained by converting, through the DAC, the digital data including the pixel data received from the timing controller 303 into a 2-1st gamma compensation voltage generated from the second gamma compensation voltage generation unit 305*b*. While scanning the pixels arranged at the low PPI in the second area, the second data drive unit 306*b* supplies, to the second data line group of the pixel array through the output buffer, the data voltage obtained by converting, through the DAC, the digital data including the pixel data received from the timing controller 303 into a 2-2nd gamma compensation voltage generated from the second gamma compensation voltage generation unit 305*b*.

When power is input to the drive IC 300, the second memory 302 stores a compensation value, register setting data, and the like received from the first memory 301. The compensation value may be applied to various algorithms for improving image quality. The compensation value may include an optical compensation value. The register setting data defines operations of the data drive unit 306, the timing controller 303, the gamma compensation voltage generation unit 305, and the like. The first memory 301 may include a flash memory. The second memory 302 may include a static random access memory (SRAM).

The host system 200 may be implemented as an application processor (AP). The host system 200 may transmit pixel data of the input image to the drive IC 300 through a mobile industry processor interface (MIPI). The host system 200 may be connected to the drive IC 300 through a flexible printed circuit (FPC).

Meanwhile, the display panel 600 may be implemented as a flexible panel that may be applied to a flexible display. In the flexible display, the size of the screen may be changed by winding, folding, and bending the flexible panel, and the flexible display may be easily manufactured in various designs. The flexible display may be implemented as a rollable display, a foldable display, a bendable display, a slidable display, and the like. The flexible panel may be manufactured as a so-called "plastic OLED panel." The plastic OLED panel may include a back plate and a pixel array on an organic thin film bonded to the back plate. The touch sensor array may be formed on the pixel array.

The back plate may be a polyethylene terephthalate (PET) substrate. The pixel array and the touch sensor array may be formed on the organic thin film. The back plate may block permeation of moisture toward the organic thin film so that the pixel array is not exposed to the moisture. The organic thin film may be a polyimide (PI) substrate. A multi-layered buffer film may be formed of an insulating material that is not illustrated on the organic thin film. The circuit layer 12 and the light emitting element layer 14 may be stacked on the organic thin film.

In the display device of the present disclosure, the pixel circuit, the gate drive unit, and the like arranged on the circuit layer 12 may include a plurality of transistors. The transistors may be implemented as an oxide TFT including an oxide semiconductor, a low temperature poly silicon (LTPS) TFT including an LTPS, and the like. The transistors may be implemented as a p-channel TFT or an n-channel TFT. In the embodiment, an example in which the transistors of the pixel circuit are implemented as the p-channel TFTs is mainly described, but the present disclosure is not limited thereto.

The transistor is a three-electrode element including a gate, a source, and a drain. The source is an electrode through which a carrier is supplied to the transistor. In the transistor, the carrier starts to flow from the source. The drain is an electrode through which the carrier moves to the outside of the transistor. In the transistor, the carrier flows from the source to the drain. In an n-channel transistor, since the carrier is an electron, a source voltage is lower than a drain voltage so that the electron may flow from the source to the drain. In the n-channel transistor, a current flows from the drain to the source. In a p-channel transistor PMOS, since the carrier is a hole, the source voltage is higher than the drain voltage so that the hole flows from the source to the drain. In the p-channel transistor, since the hole flows from the source to the drain, the current flows from the source to the drain. It should be noted that the source and the drain of the transistor are not fixed. For example, the source and the drain may be changed according to an applied voltage. Thus, the present disclosure is not limited in relation to the source and the drain of the transistor. In the following description, the source and the drain of the transistor will be referred to as first and second electrodes.

The gate pulse swings between the gate-on voltage and the gate-off voltage. The gate-on voltage is set to a voltage higher than a threshold voltage of the transistor, and the gate-off voltage is set to a voltage lower than the threshold voltage of the transistor. The transistor is turned on in response to the gate-on voltage and is turned off in response to the gate-off voltage. In the n-channel transistor, the gate-on voltage may be a gate high voltage VGH, and the gate-off voltage may be a gate low voltage VGL. In the p-channel transistor, the gate-on voltage may be the gate low voltage VGL, and the gate-off voltage may be the gate high voltage VGH.

The drive element of the pixel circuit may be implemented as a transistor. In the drive element, electrical characteristics between all pixels should be uniform but may be different due to process deviations and element characteristic deviations and may vary as a display driving time elapses. In order to compensate for the electrical characteristic deviations, the display device may include an internal compensation circuit and an external compensation circuit. The internal compensation circuit samples a threshold voltage Vth and/or mobility μ of the drive element, which is added to the pixel circuit in each of the sub-pixels and changes according to electrical characteristics of the drive element and compensates for the change in real time. The external compensation circuit transmits, to an external compensation unit, the threshold voltage and/or mobility of the drive element detected through a sensing line connected to each of the sub-pixels. A compensation unit of the external compensation circuit compensates for changes in electric characteristics of the drive element by modulating the pixel data of the input image by reflecting the sensing result. The voltage of the pixel that changes according to electrical characteristics of an external compensation drive element is detected, and an external circuit modulates the data of the input image on the basis of the detected voltage, thereby compensating for electrical characteristic deviation of the drive element between the pixels.

Figure 6:
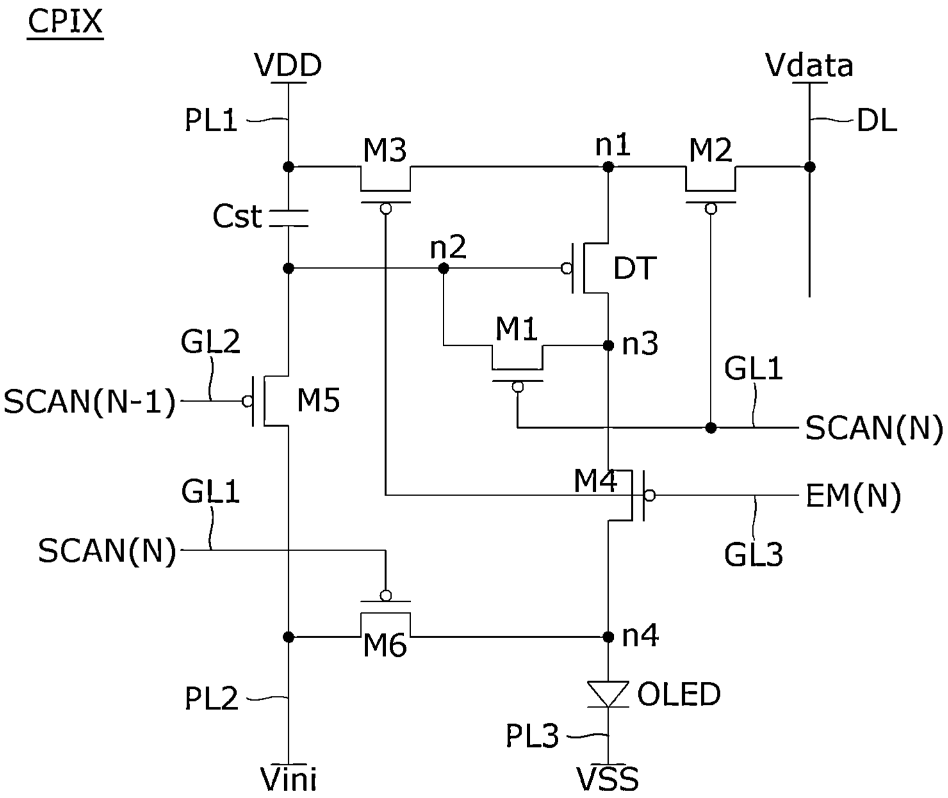
FIGS. 6 and 7 are circuit diagrams illustrating an example of a pixel circuit to which an internal compensation circuit is applied.
Figure 7:
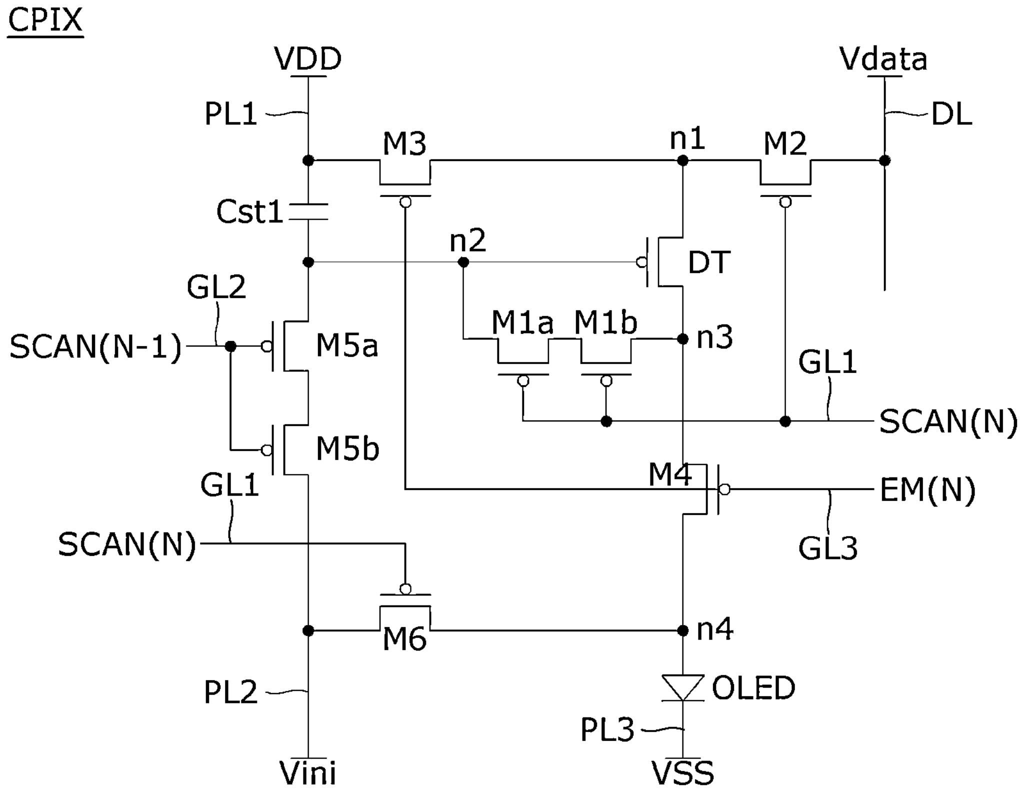
Figure 8:
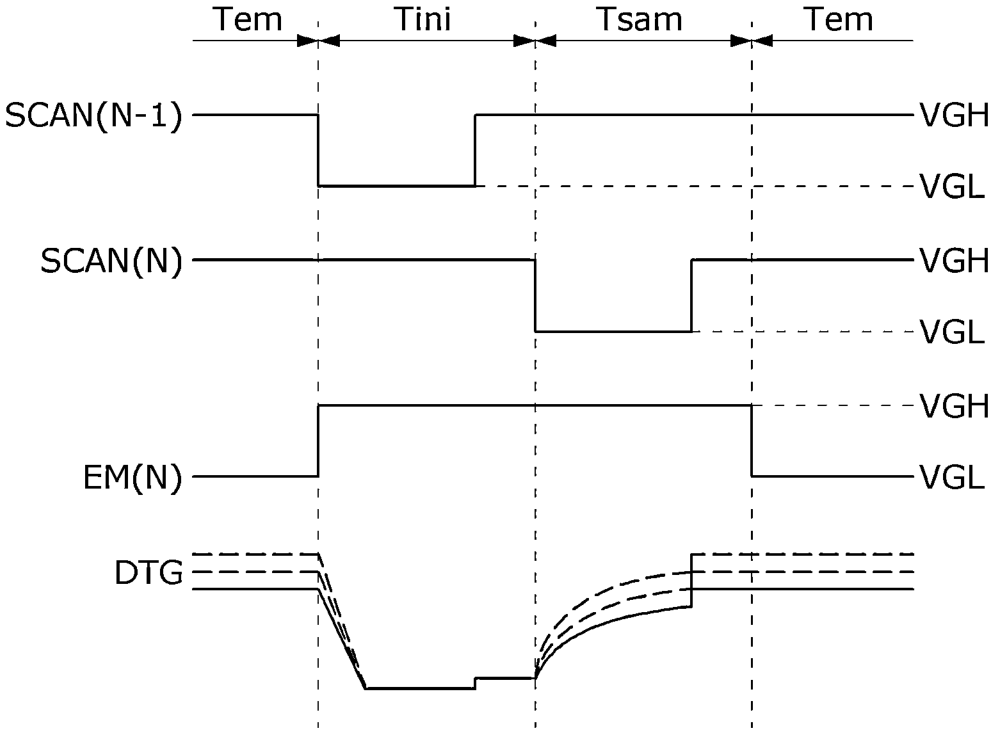
FIG. 8 is a view illustrating a method of driving the pixel circuit illustrated in FIGS. 6 and 7.

FIGS. 6 and 7 are circuit diagrams illustrating an example of a pixel circuit to which an internal compensation circuit is applied. FIG. 8 is a view illustrating a method of driving the pixel circuit illustrated in FIGS. 6 and 7. It should be noted that the pixel circuit of the present disclosure is not limited to FIGS. 6 and 7. The pixel circuit illustrated in FIGS. 6 and 7 may be equally applied to the pixel circuits of the display area DA and the first sensing area CA. The pixel circuit applicable to the present disclosure may be implemented as a circuit illustrated in FIGS. 13A, 13B, 14A, and 14B, but the present disclosure is not limited thereto, Referring to FIGS. 6 to 8, the pixel circuit includes the light emitting element OLED, a drive element DT that supplies a current to the light emitting element OLED, and an internal compensation circuit that samples the threshold voltage Vth of the drive element DT using a plurality of switch elements M1 to M6 and compensates for a gate voltage of the drive element DT by the threshold voltage Vth of the drive element DT. Each of the drive element DT and the switch elements M1 to M6 may be implemented as a p-channel TFT.

As illustrated in FIG. 8, a drive period of the pixel circuit using the internal compensation circuit may be divided into an initialization period Tini, a sampling period Tsam, and a light emission period Tem.

During the initialization period Tini, a (N−1)th scanning pulse SCAN(N−1) is generated as a pulse of the gate-on voltage VGL, and a voltage of each of a Nth scanning pulse SCAN(N) and a light emission pulse EM(N) is the gate-off voltage VGH. During the sampling period Tsam, the Nth scanning pulse SCAN(N) is generated as the pulse of the gate-on voltage VGL, and a voltage of each of the (N−1)th scanning pulse SCAN(N−01) and the light emission pulse EM(N) is the gate-off voltage VGH. During at least a part of the light emission period Tem, the light emission pulse EM(N) is generated as the gate-on voltage VGL, and a voltage of each of the (N−1)th scanning pulse SCAN(N−1) and the Nth scanning pulse SCAN(N) is generated as the gate-off voltage VGH.

During the initialization, the fifth switch element M5 is turned on according to the gate-on voltage VGL of the (N−1)th scanning pulse SCAN(N−1) so as to initialize the pixel circuit. During the sampling period Tsam, the first and second switch elements M1 and M2 are turned on according to the gate-on voltage VGL of the Nth scanning pulse SCAN(N), and thus a threshold voltage of the drive element DT is sampled and stored in a storage capacitor Cst1. At the same time, the sixth switch element M6 is turned on during the sampling period Tsam to lower the voltage of a fourth node n4 to a reference voltage Vref so as to suppress light emission of the light emitting element OLED. During the light emission period Tem, the third and fourth switch elements M3 and M4 are turned on, and thus the light emitting element OLED emits light. In the light emission period Tem, in order to precisely express the luminance of a low gray scale with a duty ratio of the light emission pulse EM(N), the light emission pulse EM(N) swings at a predetermined duty ratio between the gate-on voltage VGL and the gate-off voltage VGH, and thus the third and fourth switch elements M3 and M4 may be repeatedly turned on and off.

The light emitting element OLED may be implemented as an OLED or an inorganic light emitting diode. Hereinafter, an example in which the light emitting element OLED is implemented as an OLED will be described.

The light emitting element OLED may include an organic compound layer formed between an anode and a cathode. The organic compound layer may include a hole injection layer HIL, a hole transport layer HTL, an emission layer EML, an electron transport layer ETL, and an electron injection layer EIL, but the present disclosure is not limited thereto. When a voltage is applied to an anode electrode and a cathode electrode of the OLED, holes passing through the hole transport layer HTL and electrons passing through the electron transport layer ETL are moved to the emission layer EML to form excitons, and thus visible light is emitted from the emission layer EML.

The anode electrode of the light emitting element OLED is connected to the fourth node n4 between the fourth and sixth switch elements M4 and M6. The fourth node n4 is connected to the anode of the light emitting element OLED, a second electrode of the fourth switch element M4, and a second electrode of the sixth switch element M6. The cathode electrode of the light emitting element OLED is connected to a VSS line PL3 to which the low-potential power supply voltage VS S is applied. The light emitting element OLED emits light with a current Ids that flows due to a gate-source voltage Vgs of the drive element DT. A current path of the light emitting element OLED is switched by the third and fourth switch elements M3 and M4.

The storage capacitor Cst1 is connected between the VDD line PL1 and a first node n1. A data voltage Vdata compensated for by the threshold voltage Vth of the drive element DT is charged to the storage capacitor Cst1. Since the data voltage in each of the sub-pixels is compensated for by the threshold voltage Vth of the drive element DT, deviations in characteristics of the drive element DT are compensated for in the sub-pixels.

The first switch element M1 is turned on in response to the gate-on voltage VGL of the Nth scanning pulse SCAN(N) to connect a second node n2 and a third node n3. The second node n2 is connected to a gate electrode of the drive element DT, a first electrode of the storage capacitor Cst1, and a first electrode of the first switch element M1. The third node n3 is connected to a second electrode of the drive element DT, a second electrode of the first switch element M1, and a first electrode of the fourth switch element M4. A gate electrode of the first switch element M1 is connected to a first gate line GL1 to receive the Nth scanning pulse SCAN(N). The first electrode of the first switch element M1 is connected to the second node n2, and the second electrode of the first switch element M1 is connected to the third node n3.

Since the first switch element M1 is turned on only during a very short horizontal period 1H in which the Nth scanning pulse SCAN(N) is generated as the gate-on voltage VGL in one frame period and thus maintains an OFF state for approximately one frame period, a leakage current may occur in the OFF state of the first switch element M1. In order to suppress the leakage current of the first switch element M1, as illustrated in FIG. 7, the first switch element M1 may be implemented as a transistor having a dual gate structure in which two transistors M1*a* and M1*b* are connected in series.

The second switch element M2 is turned on in response to the gate-on voltage VGL of the Nth scanning pulse SCAN (N) to supply the data voltage Vdata to the first node n1. A gate electrode of the second switch element M2 is connected to the first gate line GL1 to receive the Nth scanning pulse SCAN(N). A first electrode of the second switch element M2 is connected to the first node n1. A second electrode of the second switch element M2 is connected to the data lines DL to which the data voltage Vdata is applied. The first node n1 is connected to the first electrode of the second switch element M2, a second electrode of the third switch element M3, and a first electrode of the drive element DT.

The third switch element M3 is turned on in response to the gate-on voltage VGL of the light emission pulse EM(N) to connect the VDD line PL1 to the first node n1. A gate electrode of the third switch element M3 is connected to a third gate line GL3 to receive the light emission pulse EM(N). A first electrode of the third switch element M3 is connected to the VDD line PL1. The second electrode of the third switch element M3 is connected to the first node n1.

The fourth switch element M4 is turned on in response to the gate-on voltage VGL of the light emission pulse EM(N) to connect the third node n3 to the anode of the light emitting element OLED. A gate electrode of the fourth switch element M4 is connected to the third gate line GL3 to receive the light emission pulse EM(N). The first electrode of the fourth switch element M4 is connected to the third node, and the second electrode thereof is connected to the fourth node n4.

The fifth switch element M5 is turned on in response to the gate-on voltage VGL of the (N−1)th scanning pulse SCAN(N−1) to connect the second node to the Vini line PL2. A gate electrode of the fifth switch element M5 is connected to the second gate line GL2 to receive the (N−1)th scanning pulse SCAN(N−1). A first electrode of the fifth switch element M5 is connected to the second node n2, and a second electrode thereof is connected to the Vini line PL2. In order to suppress the leakage current of the fifth switch element M5, as illustrated in FIG. 7, the fifth switch element M5 may be implemented as a transistor having a dual gate structure in which two transistors M5*a* and M5*b* are connected in series.

The sixth switch element M6 is turned on in response to the gate-on voltage VGL of the Nth scanning pulse SCAN (N) to connect the Vini line PL2 to the fourth node n4. A gate electrode of the sixth switch element M6 is connected to the first gate line GL1 to receive the Nth scanning pulse SCAN (N). A first electrode of the sixth switch element M6 is connected to the Vini line PL2, and the second electrode thereof is connected to the fourth node n4.

The drive element DT drives the light emitting element OLED by adjusting the current Ids flowing in the light emitting element OLED according to the gate-source voltage Vgs. The drive element DT includes a gate connected to the second node n2, the first electrode connected to the first node, and the second electrode connected to the third node n3.

During the initialization period Tini, as illustrated in FIG. 8, the (N−1)th scanning pulse SCAN(N−1) is generated as the gate-on voltage VGL. During the initialization period Tini, the Nth scanning pulse SCAN(N) and the light emission pulse EM(N) maintains the gate-off voltage VGH. Thus, during the initialization period Tini, the fifth switch element M5 is turned on, and thus the second and fourth nodes n2 and n4 are initialized to the initialization voltage Vini. A hold period Th may be set between the initialization period Tini and the sampling period Tsam. In the hold period Th, the gate pules SCAN(N−1), SCAN(N), and EM(N) maintain previous states thereof.

During the sampling period Tsam, the Nth scanning pulse SCAN(N) is generated as the gate-on voltage VGL. The pulse of the Nth scanning pulse SCAN(N) is synchronized with the data voltage Vdata of a Nth pixel line. During the sampling period Tsam, the (N−1)th scanning pulse SCAN (N−1) and the light emission pulse EM(N) maintain the gate-off voltage VGH. Thus, during the sampling period Tsam, the first and second switch elements M1 and M2 are turned on.

During the sampling period Tsam, a gate voltage DTG of the drive element DT is increased by a current flowing through the first and second switch elements M1 and M2. When the drive element DT is turned off, the gate node voltage DTG is Vdata−|Vth|. In this case, the voltage of the first node n1 is Vdata−|Vth|. During the sampling period Tsam, the gate-source voltage Vgs of the drive element DT is |Vgs|=Vdata−(Vdata−|Vth|)=|Vth|.

During the light emission period Tem, the light emission pulse EM(N) may be generated as the gate-on voltage VGL. During the light emission period Tem, in order to improve low gray scale expression, the light emission pulse EM(N) is turned on and off at a predetermined duty ratio and thus may swing between the gate-on voltage VGL and the gate-off voltage VGH. Thus, during at least a part of the light emission period Tem, the light emission pulse EM(N) may be generated as the gate-on voltage VGL.

When the light emission pulse EM(N) is the gate-on voltage VGL, a current flows between the VDD and the light emitting element OLED, and thus the light emitting element OLED may emit light. During the light emission period Tem, the (N−1)th and Nth scanning pulses SCAN(N−1) and SCAN(N) maintain the gate-off voltage VGH. During the light emission period Tem, the third and fourth switch elements M3 and M4 are repeatedly turned on and off according to the voltage of the light emission signal EM. When the light emission pulse EM(N) is the gate-on voltage VGL, the third and fourth switch elements M3 and M4 are turned on, and thus the current flows in the light emitting element OLED. In this case, Vgs of the drive element DT is |Vgs|=VDD−(Vdata−|Vth|), and the current flowing in the light emitting element OLED is $K(VDD-Vdata)^2$. K denotes a constant value determined by the charge mobility, the parasitic capacitance, the channel capacity, and the like of the drive element DT.

FIGS. 9 to 12H are views illustrating examples in which a gamma reference voltage varies according to each area of the display panel.

Referring to FIG. 9, the screen of the display panel 100 according to the embodiment includes the display area DA in which pixels are arranged at a high resolution and the first sensing area CA in which pixels are arranged at a low resolution and is divided into the first area 110*a* including the pixels arranged at the high PPI and a second area 110*b* including the pixels arranged at the high PPI and the pixels arranged at the low PPI. The data lines connected to the pixel array of the display panel 100 are classified into a first data line group DL1 including data lines connected to pixels arranged in the first area and a second data line group DL2 including data lines connected to pixels arranged in the second area. Here, the first area 110*a* and the second area 110*b* are divided into sections B1, A, and B2 in a scanning direction.

Here, the first data line group DL1 includes data lines connected to the pixels arranged at the high PPI in the first area, and the second data line group DL2 includes data lines connected to the pixels arranged at the high PPI and the pixels arranged at the low PPI in the second area.

Here, an example case in which the first sensing area CA is formed in the middle of the display area DA has been described, but the present disclosure is not limited thereto, and the first sensing area CA may be formed in various locations.

Since the PPI of the first sensing area CA is larger than the PPI of the display area DA, the luminance of the first sensing area CA may be lower than the luminance of the display area DA when the pixels of the display area DA and the pixels of the first sensing area CA are driven in a dynamic range of the same data voltage in the same gray scale. Thus, in the embodiment, an attempt is made to increase the luminance of the pixels in the first sensing area CA by expanding the dynamic range of the data voltage applied to the pixels of the first sensing area CA.

Figure 10:
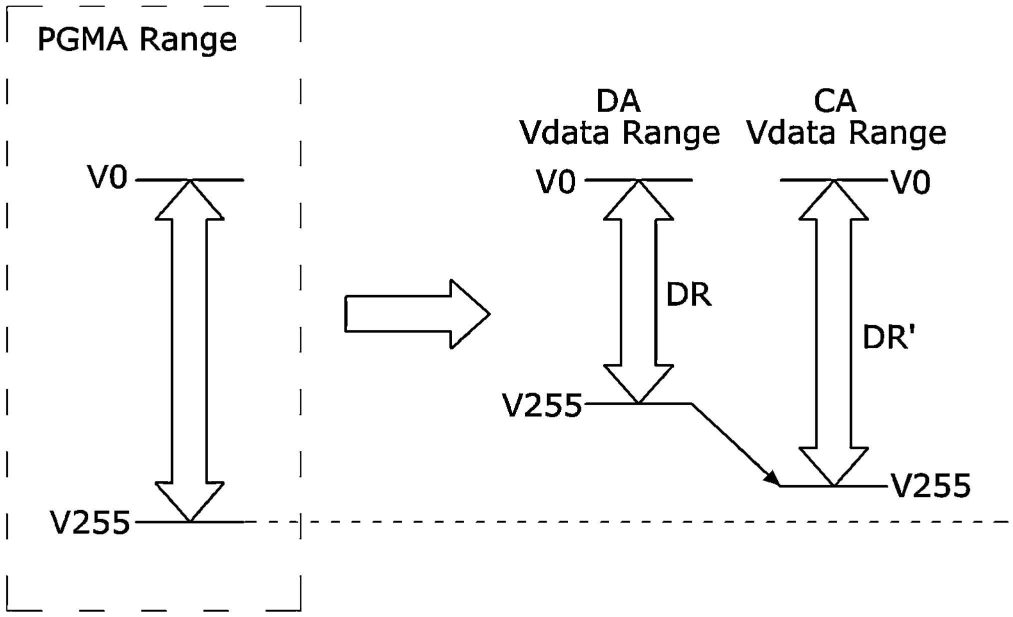

FIG. 10 is a view illustrating the data voltage applied to the pixels of the display area and the data voltage applied to the pixels of the first sensing area. Here, "PGMA Range" denotes an output voltage range of the gamma compensation voltage generation unit 305.

Referring to FIG. 10, since the PPI of the first sensing area CA is lower than that of the display area DA, when the pixels in the first sensing area CA are driven, the power supply unit 304 varies a reference voltage and provides the varied reference voltage to the gamma compensation voltage generation unit 305, the gamma compensation voltage generation unit 305 generates a gray scale-specific gamma compensation voltage by using the varied reference voltage, and the data drive unit 306 expands the dynamic range of the data voltage applied to the pixels in the first sensing area CA by using the generated gray scale-specific gamma compensation voltage. Thus, the dynamic range DR' of the data voltage applied to the pixels arranged at the low PPI is greater than the dynamic range DR of the data voltage applied to the pixels arranged at the high PPI.

Figure 11A:
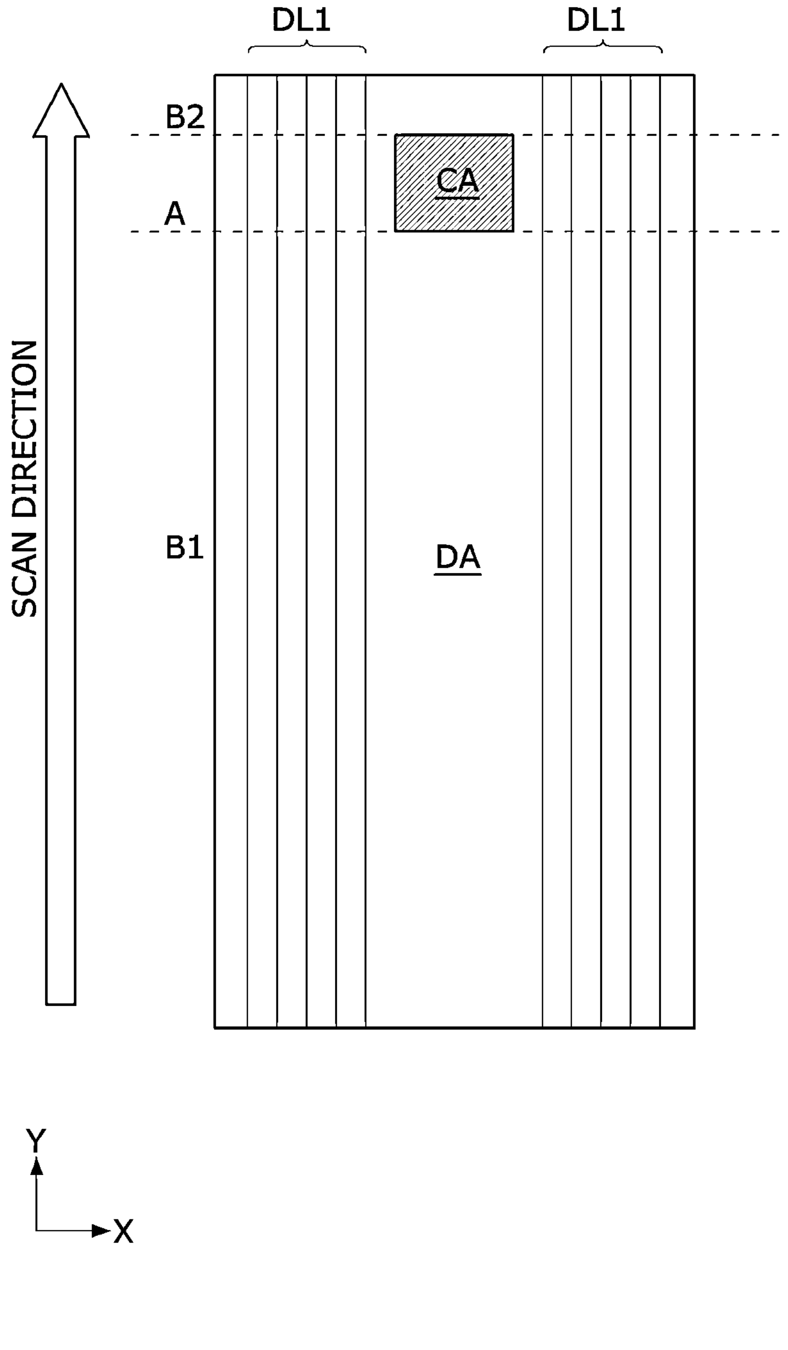
Figure 11B:
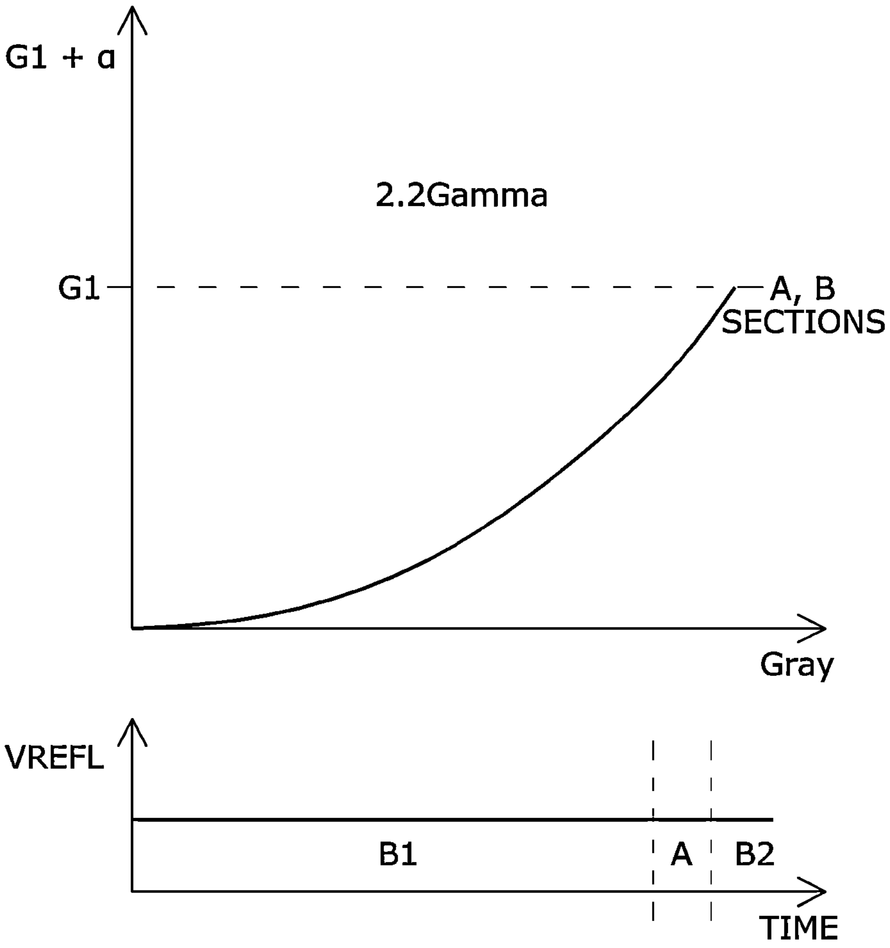

Referring to FIGS. 9, 11A, and 11B, since the first data line group DL1 includes the data lines connected to the pixels arranged at the high PPI in the first area, the power supply unit 304 supplies the first reference voltage to the first gamma compensation voltage generation unit 305*a* while scanning the pixels connected to the data lines of the first data line group DL1.

Figure 12A:
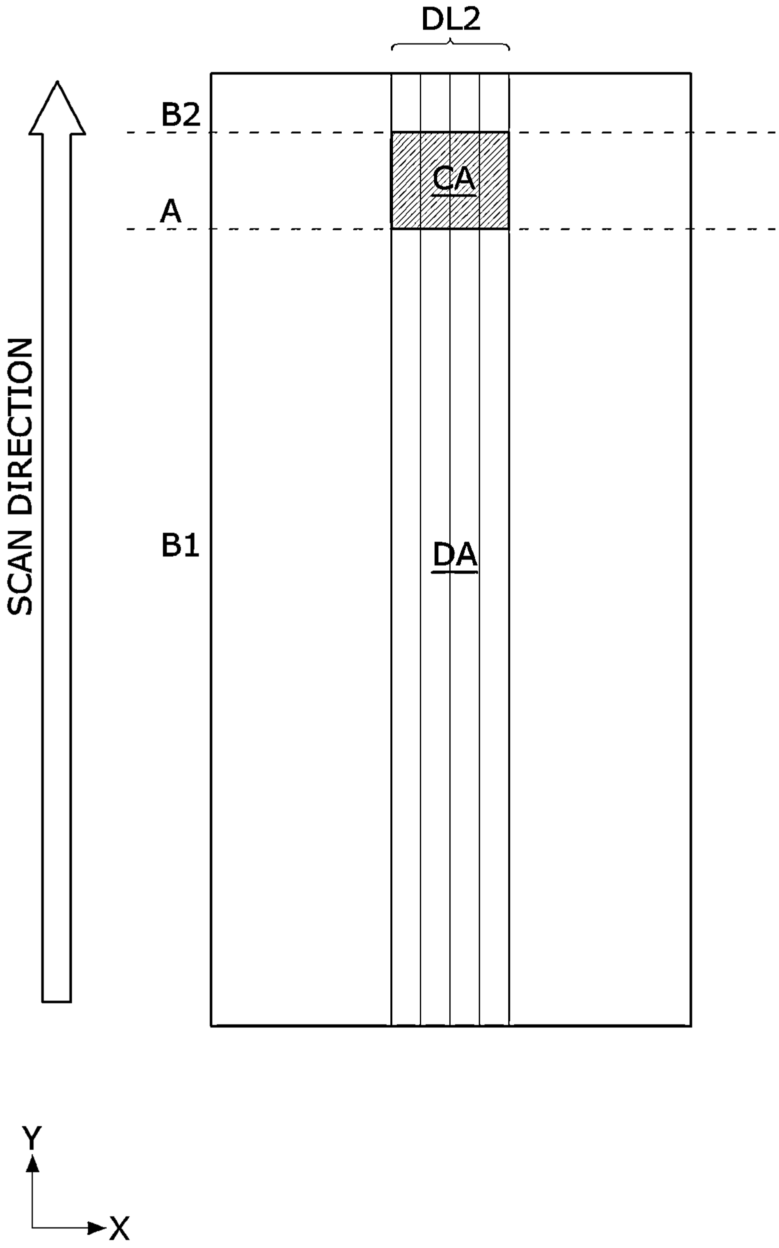
Figure 12B:
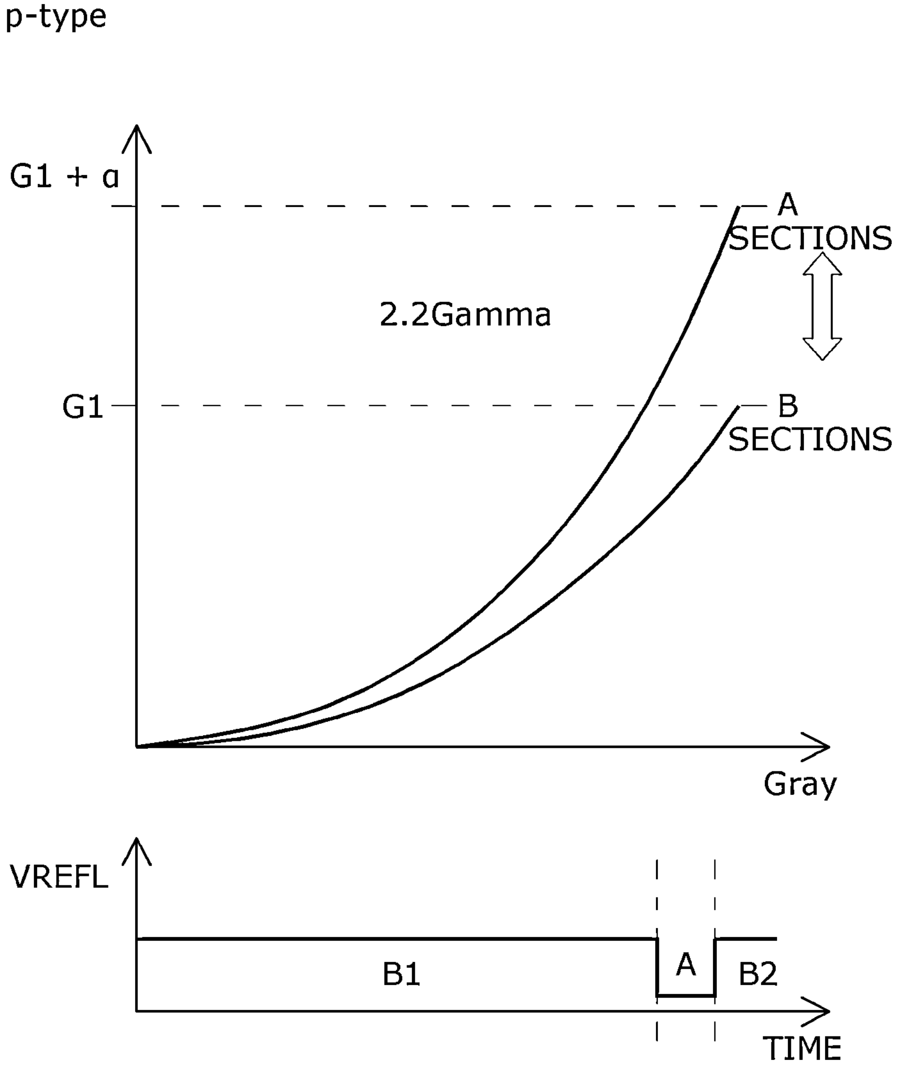
Figure 12C:
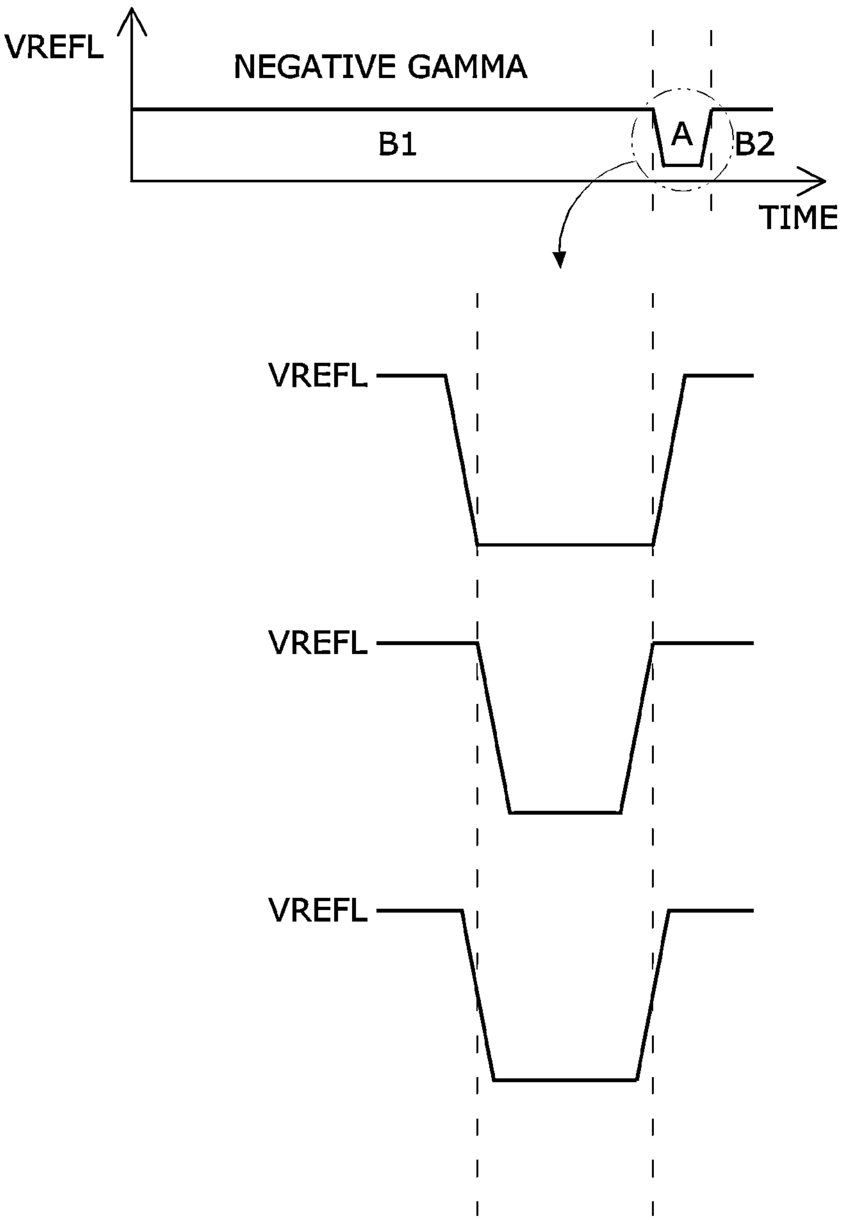

Referring to FIGS. 9, 12A, and 12B, since the second data line group DL2 includes the data lines connected to the pixels arranged at the high PPI in the second area and the data lines connected to the pixels arranged at the low PPI, the power supply unit 304 supplies different reference voltages to the second gamma compensation voltage generation unit 305*b* according to each PPI. That is, the power supply unit 304 supplies the second reference voltage to the second gamma compensation voltage generation unit 305*b* while scanning the pixels connected to the data lines of the second data line group DL2 and arranged at the high PPI, and varies the second reference voltage of the second voltage level to supply the varied second reference voltage to the second gamma compensation voltage generation unit 305*b*. Here, the varying of the second reference voltage means changing of the voltage level of the second reference voltage.

In the embodiment, an example case in which the pixel circuit is implemented as a p-type transistor is described, and thus the gamma compensation voltage of the high-gray scale data voltage may be implemented as a negative gamma compensation voltage.

For example, when a transistor that drives the light emitting elements of the pixels is implemented as a p-channel metal oxide semiconductor field effect transistor (MOS- FET), and when the data voltage is applied to a gate of the transistor, the negative gamma compensation voltage is generated. Thus, as the gray scale of pixel data RGB becomes larger, the gamma compensation voltage becomes smaller.

In this case, the first reference voltage and the second reference voltage may have different dynamic ranges. For example, the dynamic range of the second reference voltage is set to be larger than the dynamic range of the first reference voltage.

In the embodiment, an analog reference voltage may be varied so that a constant slope is provided over time at a boundary portion of the first sensing area CA, thereby additionally compensating for a boundary portion of a photographing area.

Referring to FIGS. 12C to 12H, in the embodiment, the analog reference voltage may be supplied while varying over time in a boundary portion between the display area DA and the first sensing area CA. Here, the analog reference voltage is supplied to the boundary portion in a form having a constant slope over time. A voltage between the first voltage level and the second voltage level of the second reference voltage is supplied to the boundary portion.

For example, an area in which the reference voltage varies may be the display area DA, the first sensing area CA, and an area including the display area DA and the first sensing area CA.

The fact that the analog reference voltage has a constant slope over time in the boundary portion means that the dynamic range of the data voltage applied to pixels adjacent to the boundary portion, that is, the pixels in the display area or the pixels in the first sensing area, is gradually expanded. Thus, the luminance gradually increases at the boundary portion between the display area DA and the first sensing area CA.

Figure 12D:
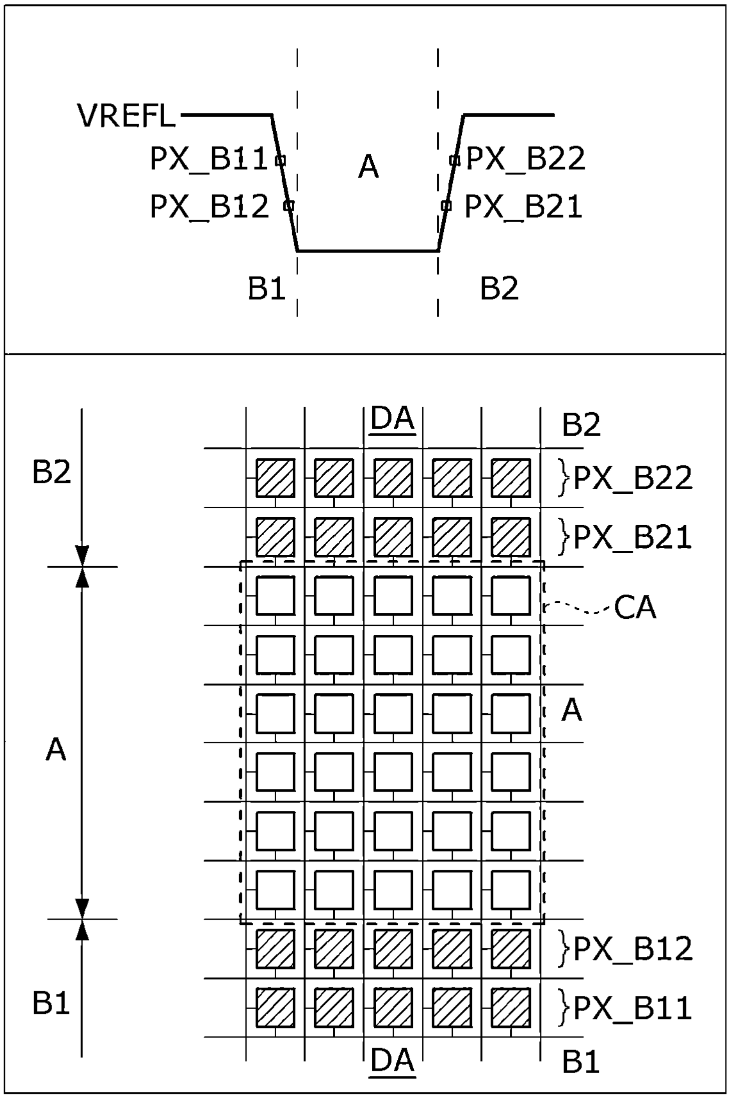

Referring to FIG. 12D, the analog reference voltage is gradually varied in a boundary area between sections B1 and B2 in which the pixels are arranged at the high PPI in the second area and a section A in which the pixels are arranged at the low PPI. The varied boundary area includes pixels PX_B11, PX_B12, PX_B21, and PX_B22, which are adjacent to the section A in which the pixels are arranged at the low PPI, among the pixels in the sections B1 and B2 in which the pixels are arranged at the high PPI.

The analog reference voltage varies in an area in which the pixels are arranged at the high PPI.

Figure 12E:
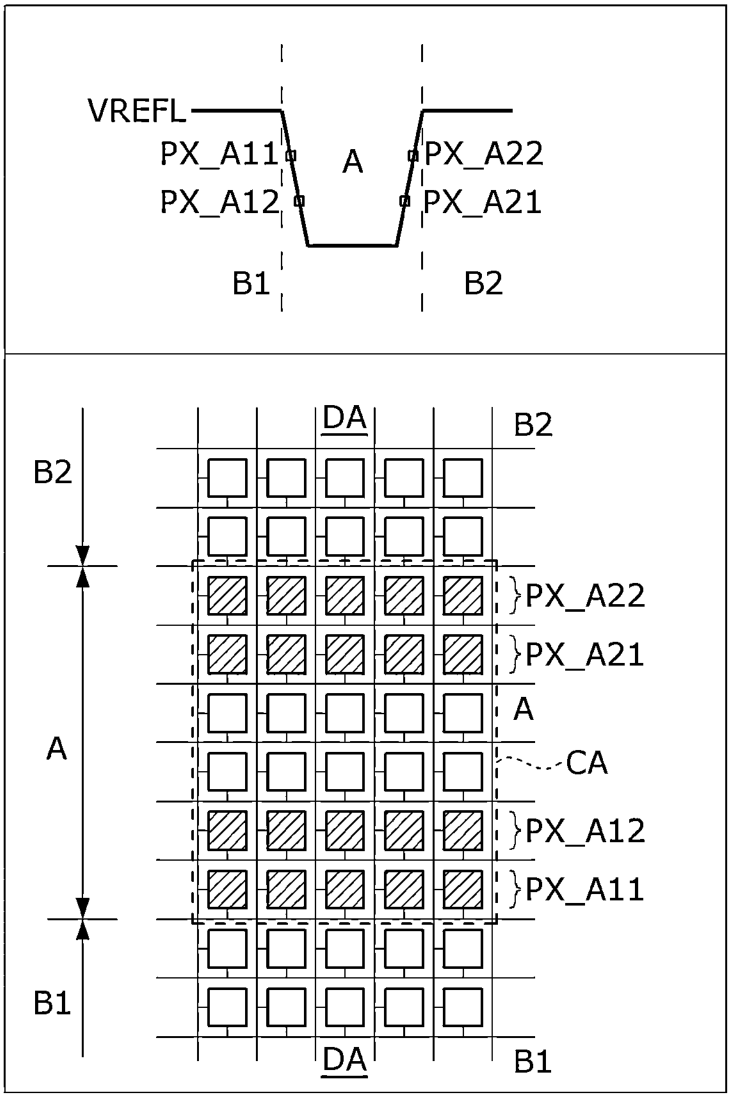

Referring to FIG. 12E, the analog reference voltage is gradually varied in a boundary area between the sections B1 and B2 in which the pixels are arranged at the high PPI in the second area and the section A in which the pixels are arranged at the low PPI. The varied boundary area includes pixels PX_A11, PX_A12, PX_A21, and PX_A22, which are adjacent to the section A in which the pixels are arranged at the low PPI, among the pixels in the sections B1 and B2 in which the pixels are arranged at the high PPI.

The analog reference voltage varies in an area in which the pixels are arranged at the low PPI.

Figure 12F:
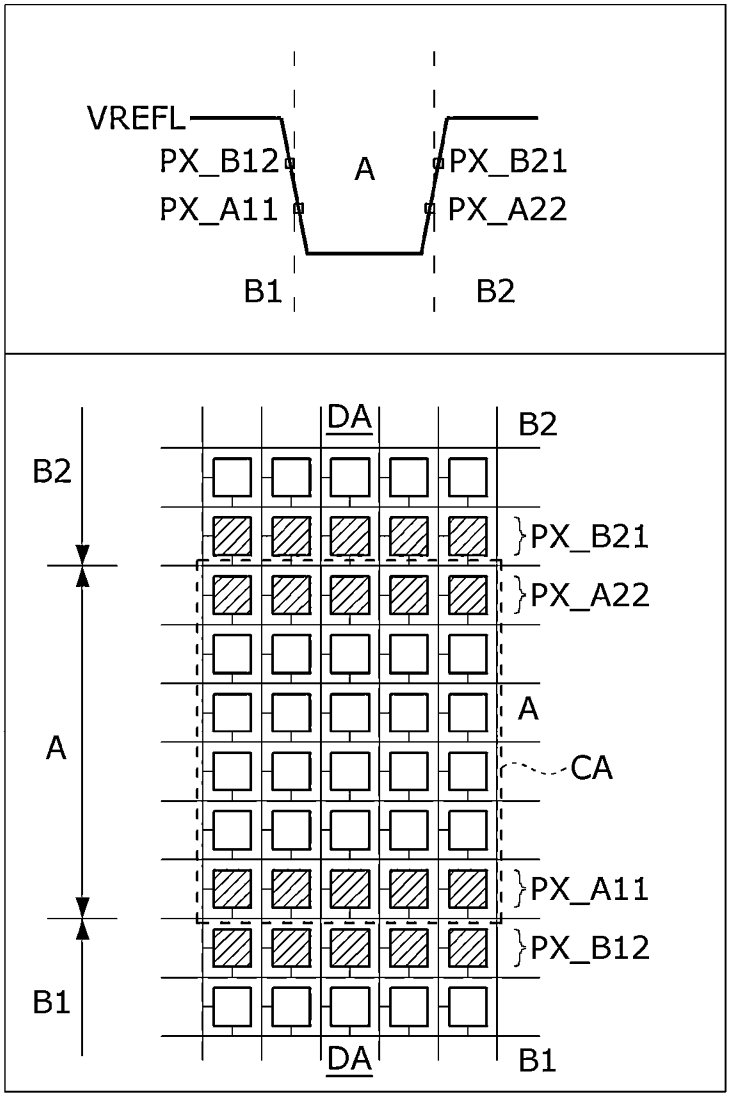

Referring to FIG. 12F, the analog reference voltage is gradually varied in a boundary area between the sections B1 and B2 in which the pixels are arranged at the high PPI in the second area and the section A in which the pixels are arranged at the low PPI. The varied boundary area includes pixels PX_B12, PX_A11, PX_B21, and PX_A22 adjacent to each other between the sections B1 and B2 in which the pixels are arranged at the high PPI and the section A in which the pixels are arranged at the low PPI.

The analog reference voltage is varied over an area in which the pixels are arranged at the high PPI and an area in which the pixels are arranged at the low PPI.

In this case, a section in which the analog reference voltage varies may be the boundary area, but the present disclosure is not limited thereto. Since the purpose of the compensation of the boundary portion is to reduce the recognition of the boundary portion in an image, an optimum variable shape can be obtained through experiment cognitive evaluation. For example, it may be designed that a section in which the analog reference voltage varies is started or terminated at the boundary portion as well as the analog reference voltage increasing rapidly or stepwise instead of the constant slope.

In this way, in the second data line group, a reference voltage may vary according to each PPI. To this end, in the embodiment, the gamma compensation voltage generation unit connected to the respective data line groups, that is, the first data line group and the second data line group, is separately configured.

Figure 12G:
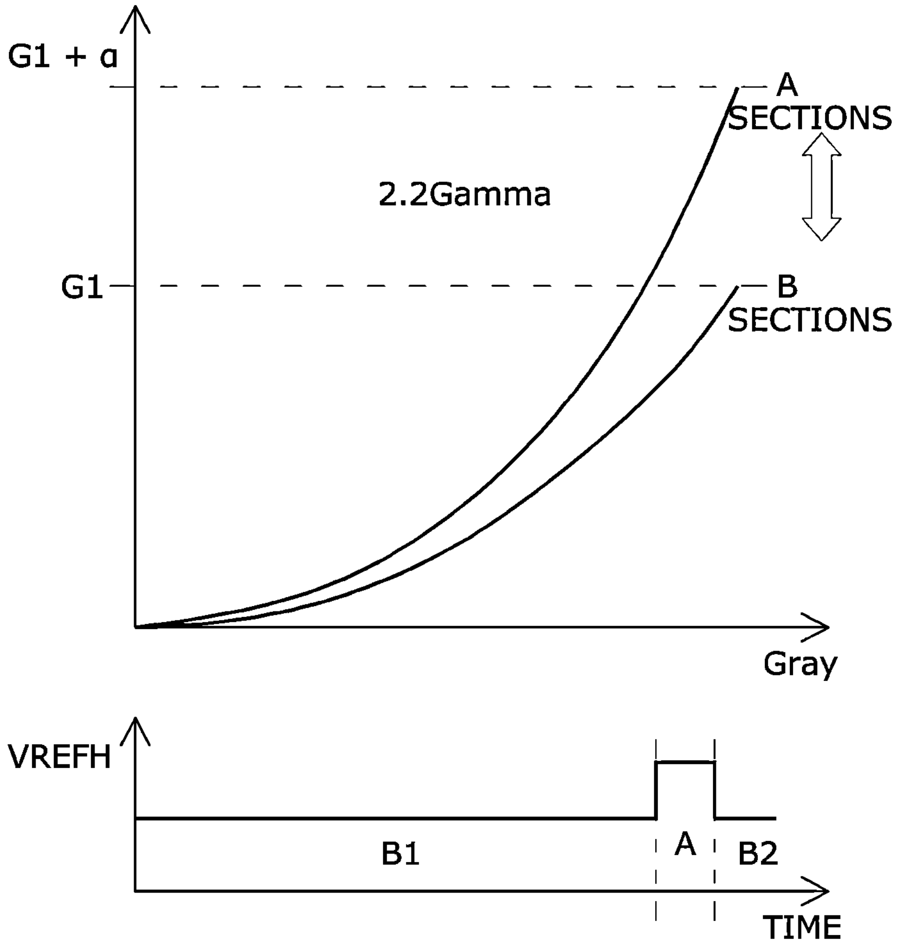
Figure 12H:
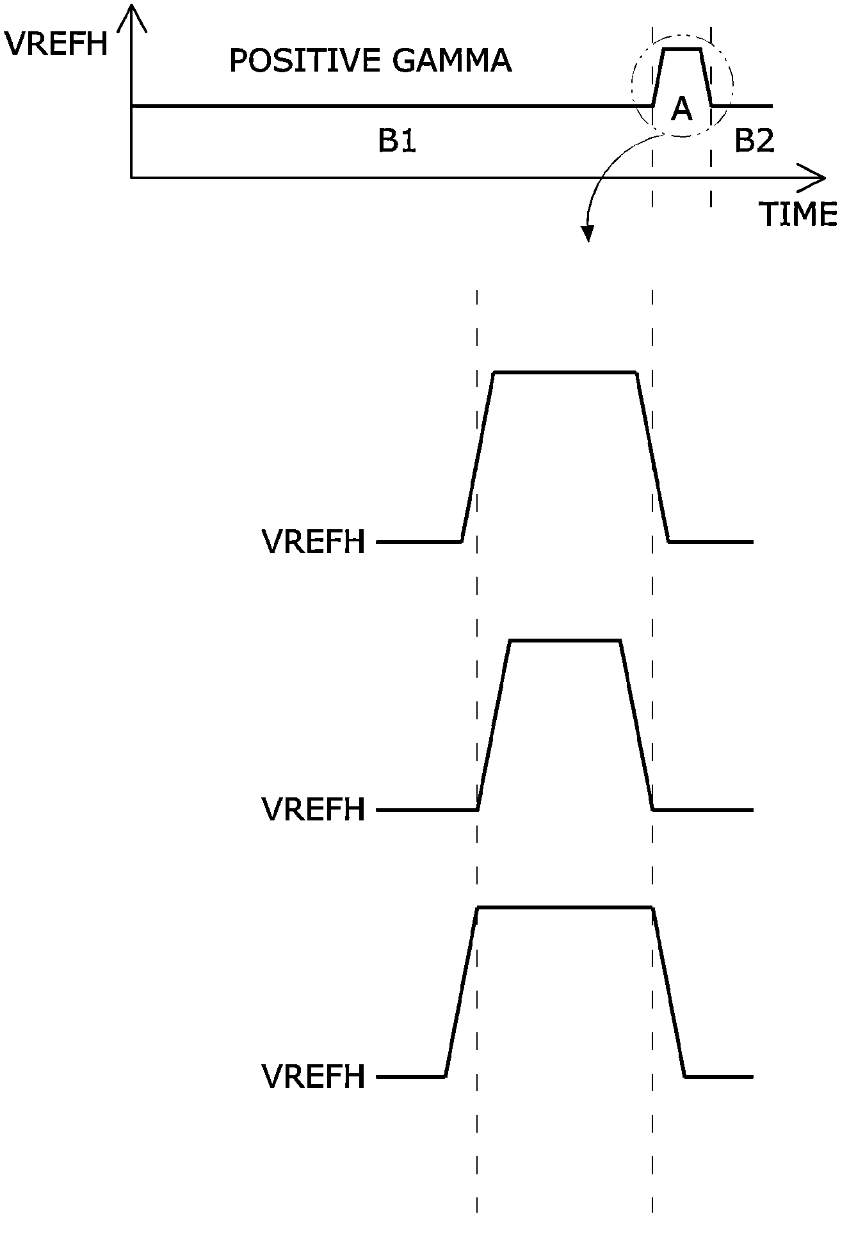

Referring to FIGS. 12G and 12H, an example is illustrated in which when the pixel circuit according to the embodiment is implemented as an n-type transistor, a reference voltage applied to the second data line group varies. The gamma compensation voltage of a high-gray scale data voltage may be implemented as a positive gamma compensation voltage.

For example, when a transistor that drives the light emitting elements, that is, an OLED, of the pixels is implemented as an n-channel MOSFET, and when the data voltage is applied to a gate of the transistor, the positive gamma compensation voltage is generated. Thus, as the gray scale of the pixel data RGB becomes larger, the gamma compensation voltage becomes smaller.

In this case, the section in which the analog reference voltage varies may be the boundary portion, but the present disclosure is not limited thereto.

Such a drive IC that provides the gamma compensation voltage of the entire gray scale is applied to a mobile device and a television (TV). A configuration of the drive IC is applied to the mobile device and the TV in different forms. In the mobile device, the gamma reference voltage is generated inside the drive IC by external control, and the compensation voltage for the entire gray scale is generated on the basis of the generated gamma reference voltage. In the TV, the gamma reference voltage generated by an external device is used to generate the compensation voltage for the entire gray scale in the drive IC. In this case, in the mobile device, a high-gray scale data voltage is changed by an external device using a code, and in the TV, the high-gray scale data voltage is changed and provided by an external device.

Figure 13A:
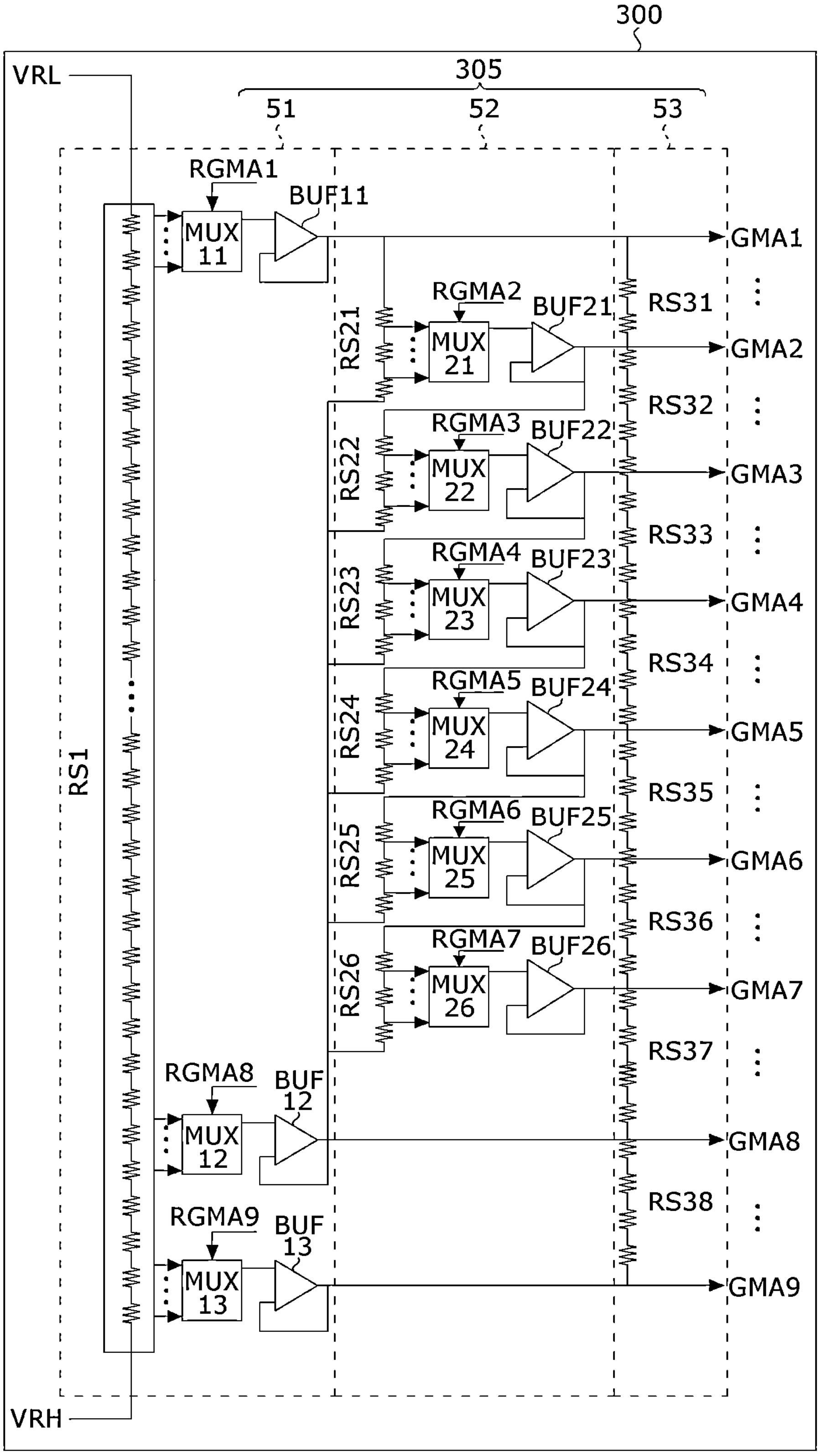
FIGS. 13A and 13B are views illustrating the configuration of the drive IC applied to a mobile device.
Figure 13B:
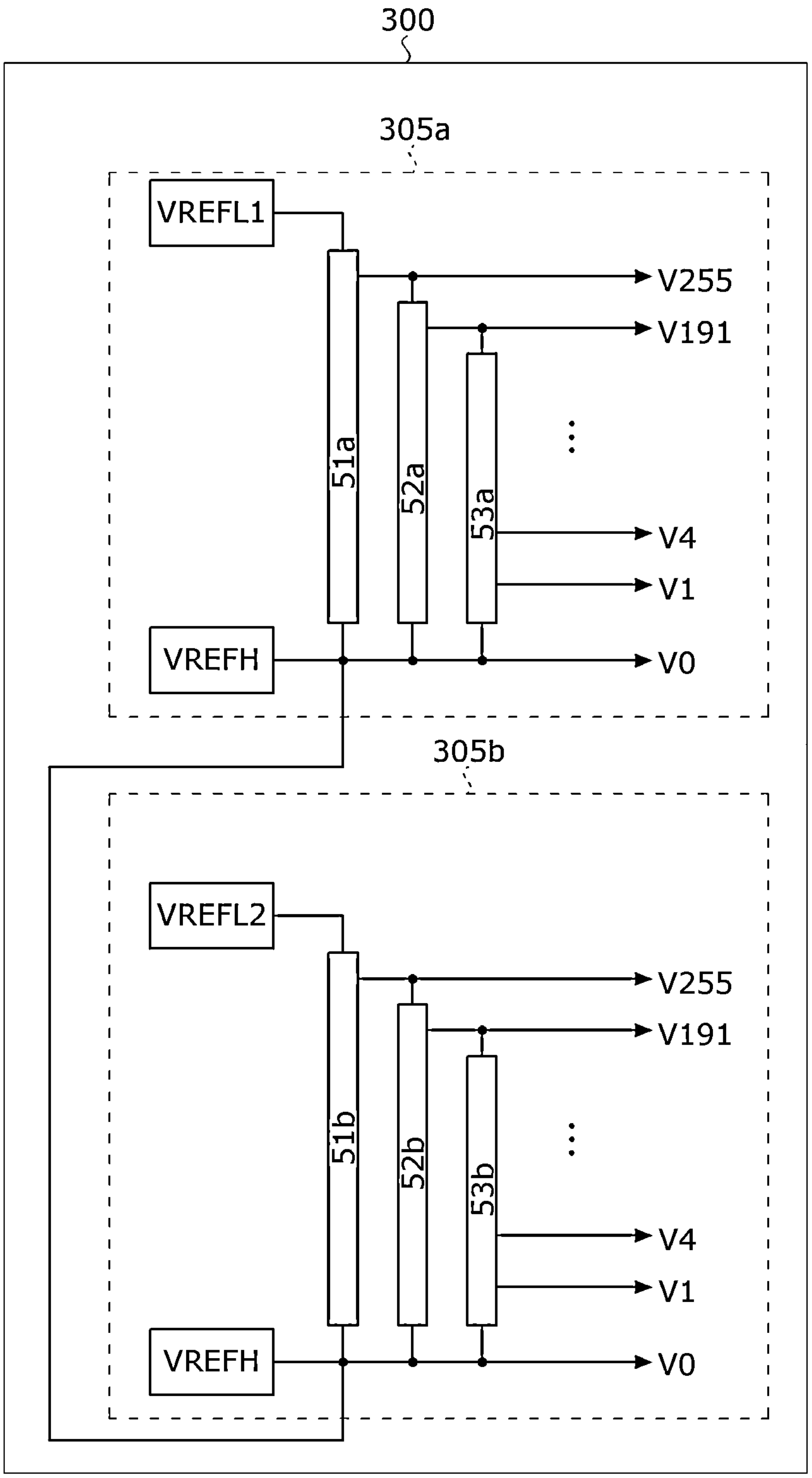

FIGS. 13A and 13B are views illustrating the configuration of the drive IC applied to a mobile device.

Referring to FIG. 13A, the drive IC 300 applied to the mobile device has the gamma compensation voltage generation unit 305 formed therein. The gamma compensation voltage generation unit 305 includes a first circuit unit 51 that receives a reference voltage REFL and generates some gamma reference voltages GMA1, GMA8, and GMA9, a second circuit unit 52 that selects and generates gamma reference voltages GMA2 to GAM7 except for the gamma reference voltages GMA1, GMA8, and GMA9 selected by the first circuit unit 51, and a third circuit unit 53 that divides the gamma reference voltages GMA1 to GMA9 from the first and second circuit units 51 and 52 and generates a gamma compensation voltage of the entire gray scale.

The first circuit unit 51 divides the reference voltage VREFL input from a power supply unit 136 and determines the first gamma reference voltage GMA1, the eighth gamma reference voltage GMA8, and the ninth gamma reference voltage GMA9 on the basis of the divided voltages. The voltage levels of the gamma reference voltages GMA1, GMA8, and GMA9 may be adjusted according to register setting values RGMA1, RGMA8, and RGMA9. The first circuit unit 51 includes a first voltage divider circuit RS1, voltage selection units MUX11 to MUX13, and a plurality of buffers BUF11 to BUF13.

The first voltage divider circuit RS1 receives the gamma reference voltage VREFL from the power supply unit 136. The first voltage divider circuit RS1 divides the gamma reference voltage VREFL using an R string circuit including resistors connected in series.

The voltage selection units include a multiplexer MUX11 that selects the first gamma reference voltage GMA1 from the voltages divided by the first voltage divider circuit RS1 according to the register setting value RGMA1, a multiplexer MUX13 that selects the eighth gamma reference voltage GMA8 from the voltages divided by the first voltage divider circuit RS1 according to the register setting value RGMA8, and a multiplexer MUX12 that selects the ninth gamma reference voltage GMA9 from voltages divided by the first voltage divider circuit RS1 according to the register setting value RGMA9.

The first gamma reference voltage GMA1 is the uppermost gamma compensation voltage. The ninth gamma reference voltage GMA9 is the lowermost gamma compensation voltage. The eighth gamma reference voltage GMA8 is a gamma tab voltage that is higher than the ninth gamma reference voltage GMA9.

The second circuit unit 52 receives the first gamma reference voltage GMA1 and the eighth gamma reference voltage GMA8 input from the first circuit unit 51, divides the first gamma reference voltage GMA1, and determines the second to eighth gamma reference voltages GMA2 to GMA8. The voltage levels of the gamma reference voltages GMA2 to GMA7 may be adjusted according to the register setting values RGMA2 to RGMA7.

The second circuit unit 52 includes a second voltage divider circuit RS2, voltage selection units MUX21 to MUX27, and a plurality of buffers BUF21 to BUF27.

The second voltage divider circuit RS2 is divided into 2-1st to 2-6th voltage divider circuits RS21 to RS26. Each of the 2-1st to 2-6th voltage divider circuits RS21 to RS26 divides an input voltage using the R string circuit including resistors connected in series. The voltage selection units MUX21 to MUX26 include a 2-1st multiplexer MUX21 connected between the 2-1st voltage divider circuit RS21 and the 2-1st buffer BUF21, a 2-2nd multiplexer MUX22 connected between the 2-2nd voltage divider circuit RS22 and the 2-2nd buffer BUF22, a 2-3rd multiplexer MUX23 connected between the 2-3rd voltage divider circuit RS23 and the 2-3rd buffer BUF23, a 2-4th multiplexer MUX24 connected between the 2-4th voltage divider circuit RS24 and the 2-4th buffer BUF24, a 2-5th multiplexer MUX25 connected between the 2-5th voltage divider circuit RS25 and the 2-5th buffer BUF25, and a 2-6th multiplexer MUX26 connected between the 2-6th voltage divider circuit RS26 and the 2-6th buffer BUF26.

The 2-1st voltage divider circuit RS21 receives the first gamma reference voltage GMA1 and the eighth gamma reference voltage GMA8, divides the first gamma reference voltage GMA1, and outputs different voltages through nodes between resistors. The 2-1st multiplexer MUX21 selects, as the second gamma reference voltage GMA2, one of the voltages divided by the 2-1st voltage divider circuit RS21 according to the register setting RGMA2. The 2-1st buffer BUF21 supplies the second gamma reference voltage GMA2 input from the 2-1st multiplexer MUX21 to a node between a 3-1st voltage divider circuit RS31 and a 3-2nd voltage divider circuit RS32.

The 2-2nd voltage divider circuit RS22 receives the second gamma reference voltage GMA2 and the eighth gamma reference voltage GMA8, divides the second gamma reference voltage GMA2, and outputs different voltages through nodes between resistors. The 2-2nd multiplexer MUX22 selects, as the third gamma reference voltage GMA3, one of the voltages divided by the 2-2nd voltage divider circuit RS22 according to the register setting RGMA3. The 2-2nd buffer BUF22 supplies the third gamma reference voltage GMA3 input from the 2-2nd multiplexer MUX22 to a node between a 3-2nd voltage divider circuit RS32 and a 3-3rd voltage divider circuit RS33.

The 2-6th voltage divider circuit RS26 receives the sixth gamma reference voltage GMA6 and the eighth gamma reference voltage GMA8, divides the sixth gamma reference voltage GMA6, and outputs different voltages through nodes between resistors. The 2-6th multiplexer MUX26 selects, as the seventh gamma reference voltage GMA7, one of the voltages divided by the 2-6th voltage divider circuit RS26 according to the register setting RGMA7. The 2-6th buffer BUF26 supplies the seventh gamma reference voltage GMA7 input from the 2-6th multiplexer MUX26 to a node between a 3-6th voltage divider circuit RS36 and a 3-7th voltage divider circuit RS37.

The third circuit unit 53 receives the gamma reference voltages GMA1 to GMA9, divides the gamma reference voltages GMA1 to GMA9 and outputs gamma compensation voltages of the entire gray scale that may be expressed in the pixel data of the input image. The third circuit unit 53 includes a third voltage divider circuit RS3.

Each of the 3-1st to 3-8th voltage divider circuits RS31 to RS38 divides an input voltage using the R string circuit including resistors connected in series. The 3-1st voltage divider circuit RS31 divides the first gamma reference voltage GMA1 and the second gamma reference voltage GMA2 and outputs gray scale-specific gamma compensation voltages between the first gamma reference voltage GMA1 and the second gamma reference voltage GMA2. The 3-2nd voltage divider circuit RS32 divides the second gamma reference voltage GMA2 and the third gamma reference voltage GMA3 and outputs gray scale-specific gamma compensation voltages between the second gamma reference voltage GMA2 and the third gamma reference voltage GMA3. The 3-6th voltage divider circuit RS36 divides the sixth gamma reference voltage GMA6 and the seventh gamma reference voltage GMA7 and outputs gray scale-specific compensation voltages between the sixth gamma reference voltage GMA6 and the seventh gamma reference voltage GMA7. The 3-7th voltage divider circuit RS37 divides the seventh gamma reference voltage GMA7 and the eighth gamma reference voltage GMA8 and outputs gray scale-specific compensation voltages between the seventh gamma reference voltage GMA7 and the eighth gamma reference voltage GMA8. The 3-8th voltage divider circuit RS38 divides the eighth gamma reference voltage GMA8 and the ninth gamma reference voltage GMA9 and outputs gray scale-specific gamma compensation voltages between the eighth gamma reference voltage GMA8 and the ninth gamma reference voltage GMA9.

In this case, when the pixel circuit is implemented as a p-type transistor, the gamma reference voltage VREFH may be commonly used, and when the pixel circuit is implemented as an n-type transistor, the gamma reference voltage VREFL may be commonly used.

Referring to FIG. 13B, the drive IC 300 applied to the mobile device according to the embodiment includes two gamma compensation voltage generation units 305 therein connected to first and second data line areas.

The gamma compensation voltage generation unit according to the embodiment is configured by connecting the gamma compensation voltage generation unit illustrated in FIGS. 13A and 13B to the first and second data line groups, and since the circuit configurations and the operation principles thereof are substantially the same, a detailed description thereof will be omitted.

Here, the first gamma compensation voltage generation unit 305*a* receives a first reference voltage VREFL1 from the power supply unit 304 to generate a gamma reference voltage and generates a gray scale-specific first gamma compensation voltage using the gamma reference voltage, and the second gamma compensation voltage generation unit 305*b* receives a second reference voltage VREFL2 from the power supply unit 304 to generate a gamma reference voltage and generates gray scale-specific second gamma compensation voltages different according to each PPI using the gamma reference voltage.

The second gamma compensation voltage generation unit 305*b* divides the first voltage level of the second reference voltage to generate the gamma reference voltage and generates a gray scale-specific 2-1st gamma compensation voltage using the gamma reference voltage.

The second gamma compensation voltage generation unit 305*b* divides the second voltage level of the second reference voltage to generate the gamma reference voltage and generates a gray scale-specific 2-2nd gamma compensation voltage using the gamma reference voltage.

Figure 14A:
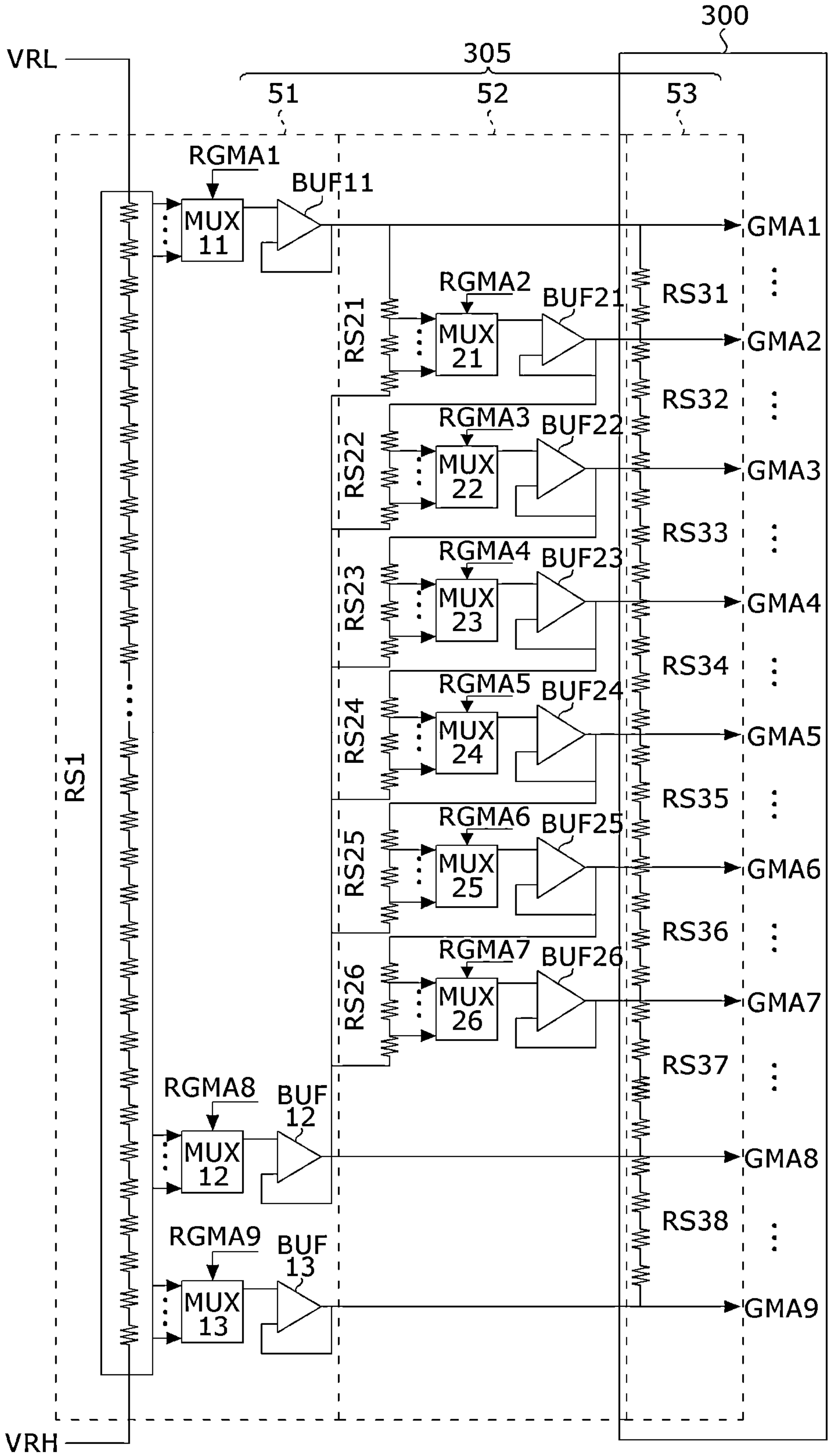
FIGS. 14A and 14B are views illustrating the configuration of the drive IC applied to the display device.
Figure 14B:
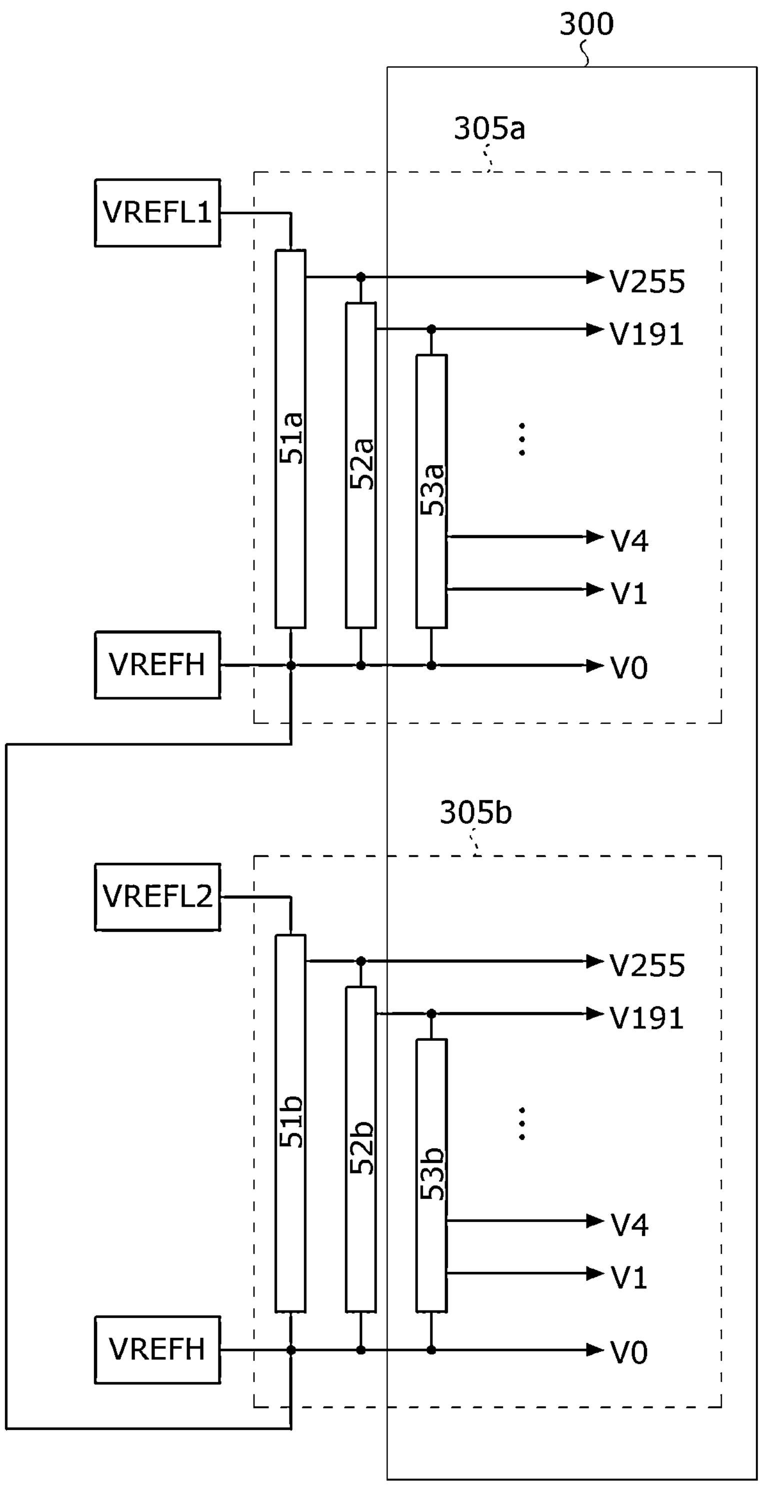

FIGS. 14A and 14B are views illustrating the configuration of the drive IC applied to the display device.

Referring to FIG. 14A, the drive IC 300 applied to the TV has a part of the gamma compensation voltage generation unit 305 formed therein. The gamma compensation voltage generation unit 305 includes a first circuit unit 51 that receives a reference voltage REFL and generates some gamma reference voltages GMA1, GMA8, and GMA9, a second circuit unit 52 that selects and generates gamma reference voltage GMA2 to GAM7 except for the gamma reference voltages GMA1, GMA8, and GMA9 selected by the first circuit unit 51, and a third circuit unit 53 that divides the gamma reference voltages GMA1 to GMA9 from the first and second circuit units 51 and 52 and generates a gamma compensation voltage of the entire gray scale.

The first circuit unit 51 and the second circuit unit 52 are provided outside the drive IC 300, and the third circuit unit 53 is provided inside the drive IC 300. Thus, the first circuit unit 51 and the second circuit unit 52 outside the drive IC 300 generate the gamma reference voltages GMA1 to GMA9 to provide the generated gamma reference voltages GMA1 to GMA9 to the third circuit unit 53 inside the drive IC 300, and the third circuit unit 53 inside the drive IC 300 divides the supplied gamma reference voltages GMA1 to GMA9 to generate the gamma compensation voltage for the entire gray scale.

Referring to FIG. 14B, the drive IC 300 applied to the TV according to the embodiment includes the two gamma compensation voltage generation units 305*a* and 305*b* connected to the first and second data line groups and third circuit units 53*a* and 53*b* of the two gamma compensation voltage generation units 305*a* and 305*b*.

Figure 15:
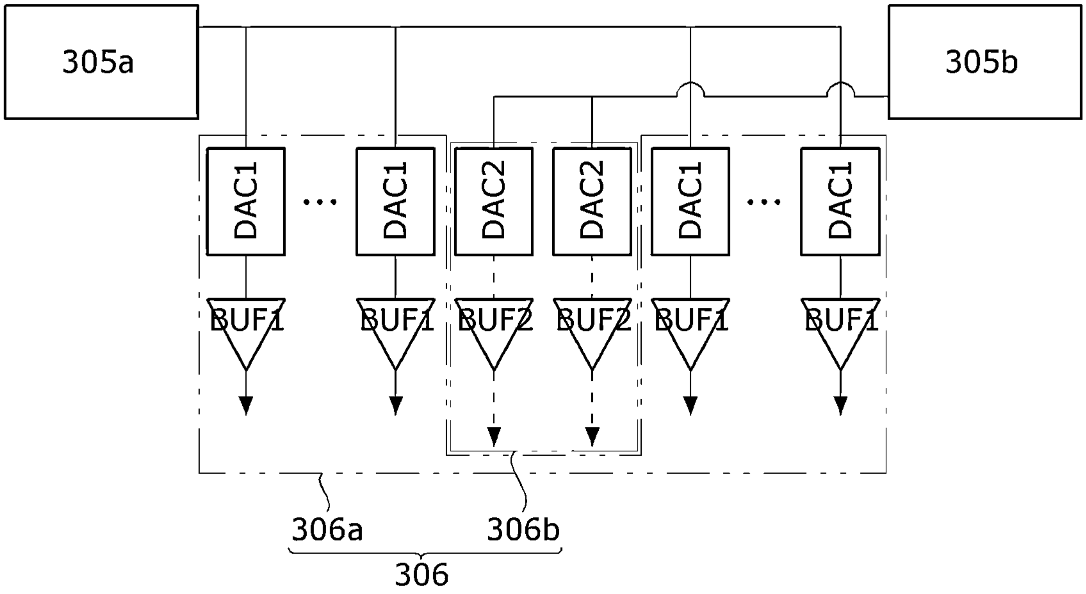
FIG. 15 is a block diagram schematically illustrating a configuration of a data drive unit according to the embodiment.

The gamma compensation voltage generation units 305*a* and 305*b* according to the embodiment are configured by connecting the gamma compensation voltage generation unit illustrated in FIG. 15 to the first and second data line groups, and since the circuit configurations and the operation principles thereof are substantially the same, a detailed description thereof will be omitted.

Here, the third circuit unit 53*a* of the first gamma compensation voltage generation unit 305*a* receives a gamma reference voltage from the outside of the drive IC 30 to generate a gray scale-specific first gamma compensation voltage, and the third circuit unit 53*b* of the second gamma compensation voltage generation unit 305*b* receives a gamma reference voltage from the outside of the drive IC 300 to generate gray scale-specific second gamma compensation voltages different according to each PPI.

The second gamma compensation voltage generation unit 305*b* divides the first voltage level of the second reference voltage to generate the gamma reference voltage and generates a gray scale-specific 2-1st gamma compensation voltage using the gamma reference voltage.

The second gamma compensation voltage generation unit 305*b* divides the second voltage level of the second reference voltage to generate the gamma reference voltage and generates a gray scale-specific 2-2nd gamma compensation voltage using the gamma reference voltage.

FIG. 15 is a block diagram schematically illustrating a configuration of a data drive unit according to the embodiment.

Referring to FIG. 15, the data drive unit 306 includes a first DAC DAC1, a second DAC DAC2, a first output buffer BUF1, and a second output buffer BUF2. Here, the data drive unit 306 includes the first data drive unit 306*a* and the second data drive unit 306*b*. The first data drive unit 306*a* is connected to the first gamma compensation voltage generation unit 305*a*, and the second data drive unit 306*b* is connected to the second gamma compensation voltage generation unit 305*b*.

The first DAC DAC1 converts digital data including the pixel data received from the timing controller 303 into a first gamma compensation voltage to output a data voltage. The first output buffer BUF1 is connected to an output node of the first DAC DAC1 to supply the data voltage output from the first DAC DAC1 to the data lines DL of the pixel array.

The second DAC DAC2 converts digital data including the pixel data received from the timing controller 303 into the first gamma compensation voltage to output a data voltage or converts the digital data into the second gamma compensation voltage to output the data voltage. The second output buffer BUF2 is connected to an output node of the second DAC DAC2 to supply the data voltage output from the second DAC DAC2 to the data lines DL of the pixel array.

Figure 16:
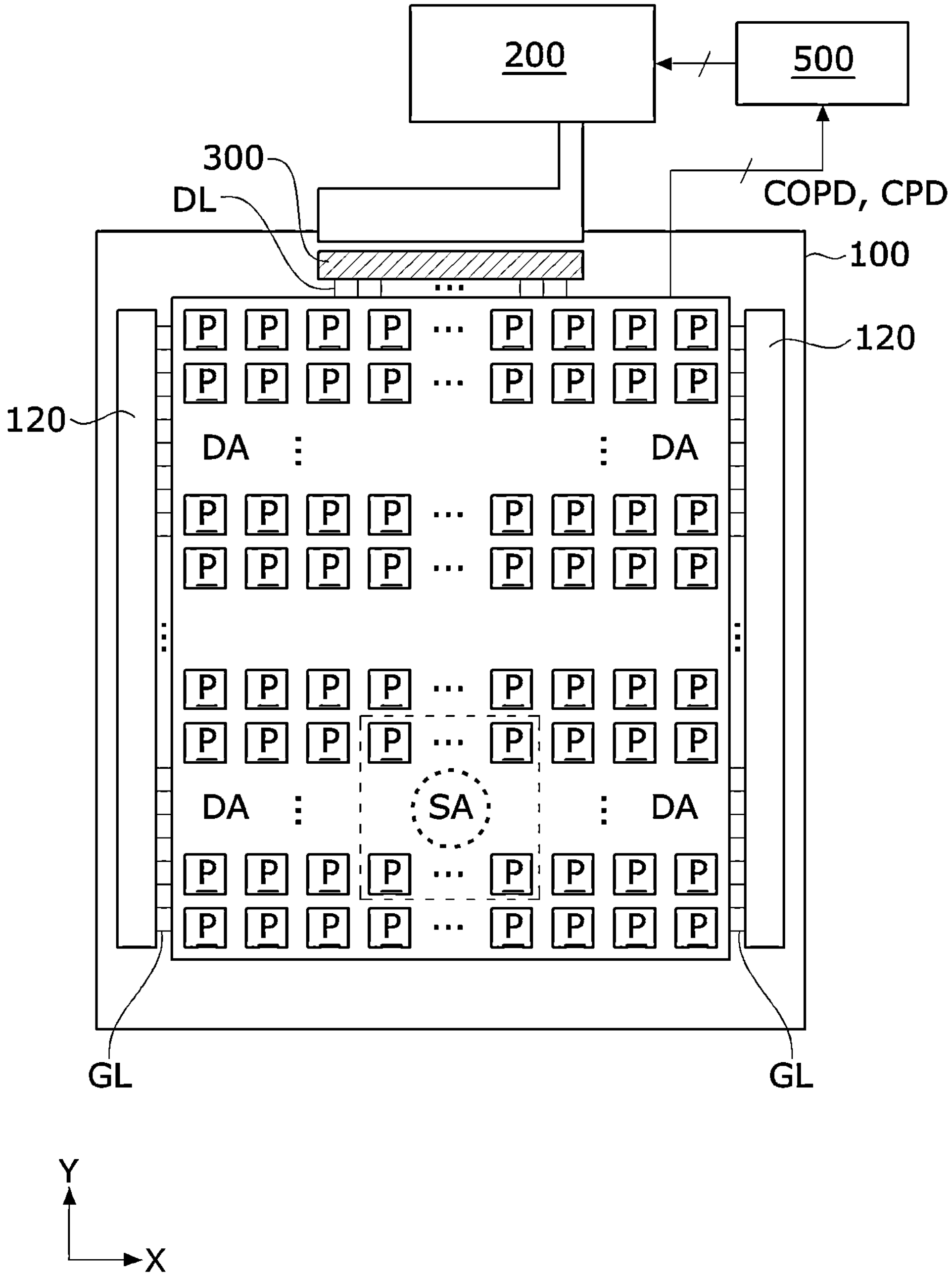
FIG. 16 is a view illustrating a display device to which a fingerprint recognition module is applied according to the embodiment.
Figure 17:
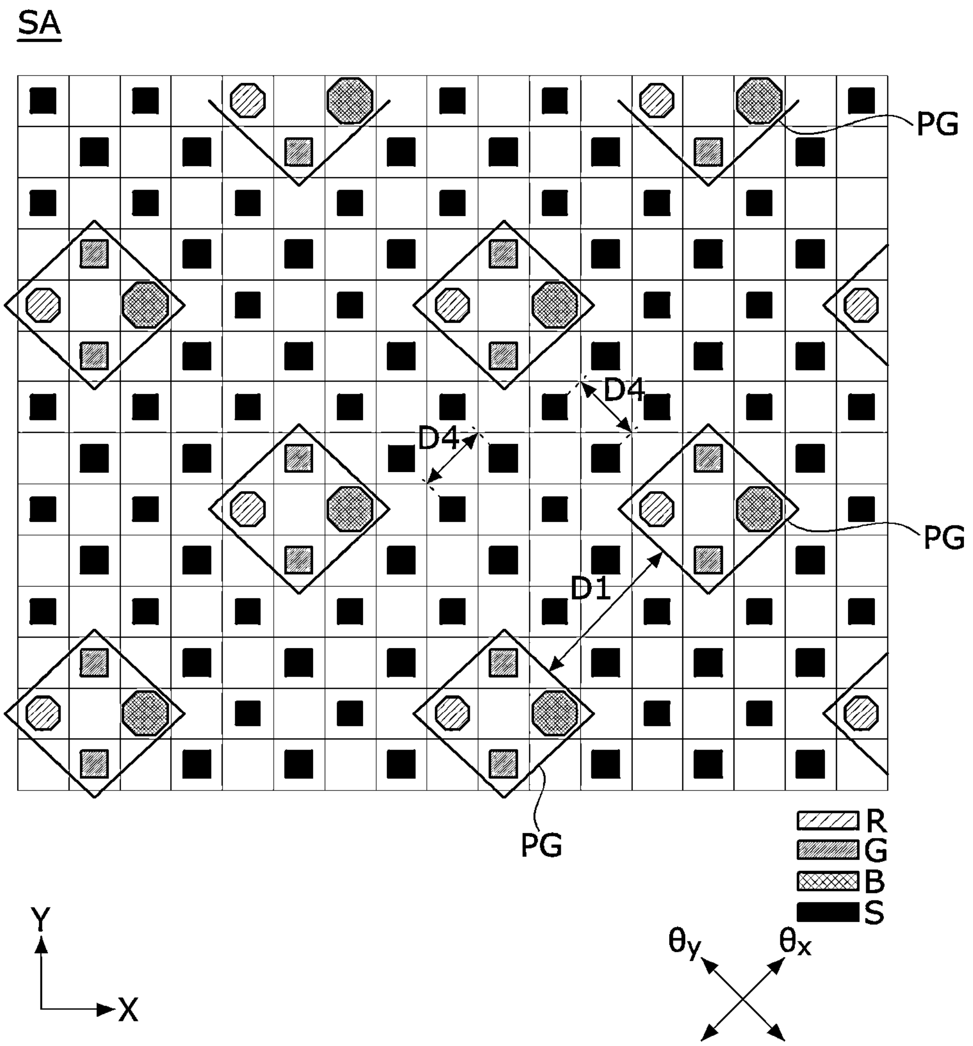
FIG. 17 is a view illustrating an example of a pixel and a photosensor in a second sensing area SA.

FIG. 16 is a view illustrating a display device to which a fingerprint recognition module is applied according to the embodiment, and FIG. 17 is a view illustrating an example of a pixel and a photosensor in a second sensing area SA.

Referring to FIGS. 16, the display device includes the display panel 100 in which the pixel array is arranged on the screen, the display panel drive unit, and the like. The screen on which the input image is reproduced on the display panel 100 includes the display area DA and the second sensing area SA.

In the display area DA and the second sensing area SA, each sub-pixel of display pixels includes a pixel circuit. The pixel circuit may include a drive element that supplies a current to the light emitting element OLED, a plurality of switch elements that sample a threshold voltage of the drive element and switch a current path of the pixel circuit, a capacitor that maintains a gate voltage of the drive element, and the like.

The second sensing area SA includes pixels in which the pixel data is written and sensor pixels S spaced apart from each other at a predetermined interval with the pixels interposed therebetween. The sensor pixels S include photosensors and a photosensor drive circuit that drives the photosensors. The display pixels in the second sensing area SA emit light according to the data voltage of the pixel data in the display mode to display input data but emit light with high luminance according to a voltage of a light source driving data and are thus driven as light sources in a fingerprint recognition mode. The light source driving data is data irrelevant to the pixel data of the input image.

Referring to FIG. 17, the second sensing area SA includes pixel groups PG spaced apart from each other by a predetermined distance D1 and sensor pixels S arranged between the adjacent pixel groups PG and spaced apart from each other at regular intervals.

The pixel group PG may include one or two pixels. Each of the pixels of the pixel group PG may include two to four sub-pixels. For example, one pixel in the pixel group PG may include R, G, and B sub-pixels or may include two sub-pixels and may further include a W sub-pixel. The first pixel PIX1 may be configured as R and G sub-pixels, and the second pixel PIX2 may be configured as B and G sub-pixels. Each of the photosensors S includes an organic/inorganic photo diode. Distances D4 between the adjacent photosensors S in four directions X, Y, Ox, and Oy are substantially the same. The X axis and the Y axis denote two orthogonal directions. Ox and Oy denote inclined axis directions shifted by 45 degrees from the X axis and Y axis, respectively.

Figure 18A:
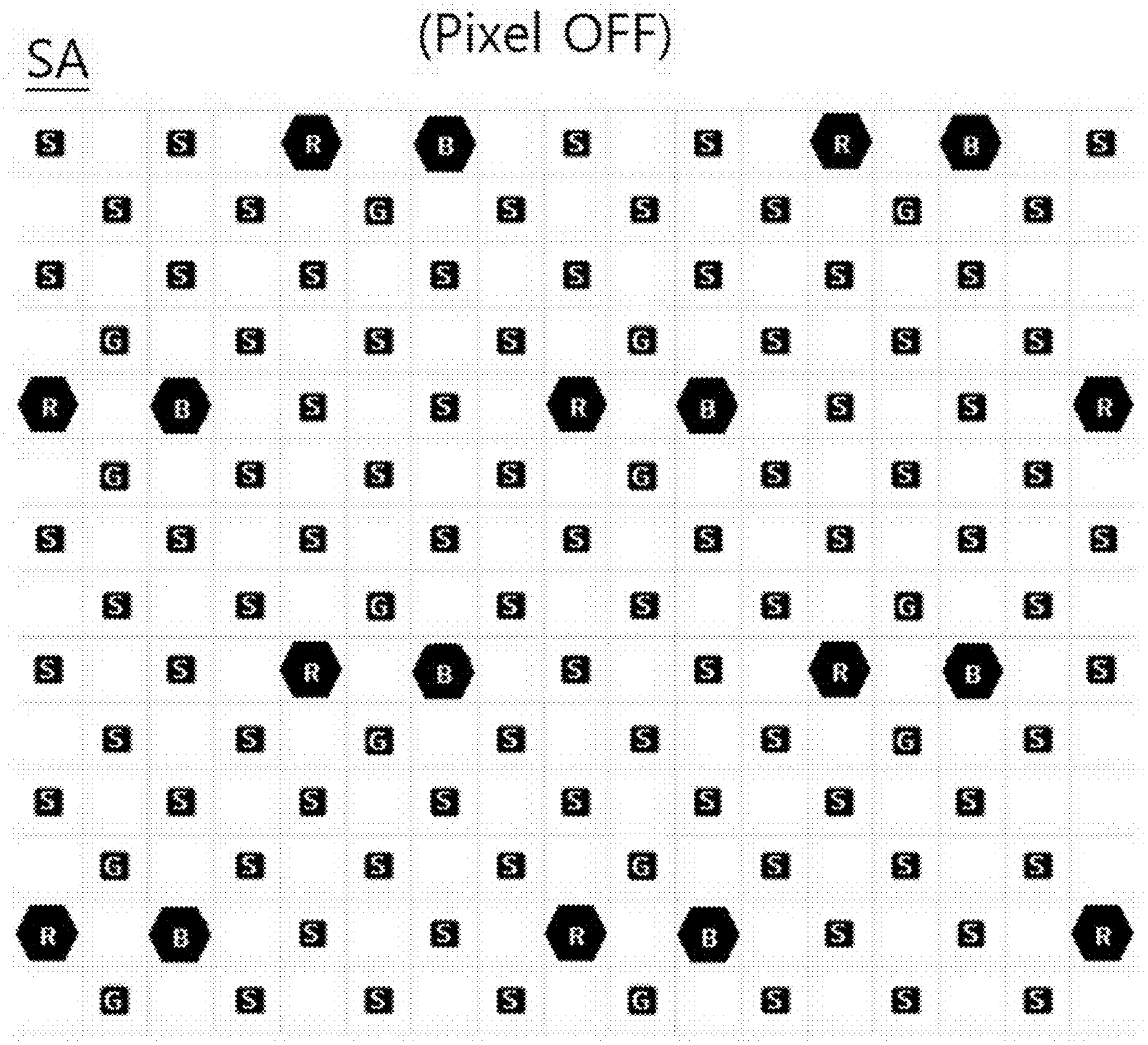
FIGS. 18A and 18B are views illustrating an operation of the second sensing area illustrated in FIG. 17.
Figure 18B:
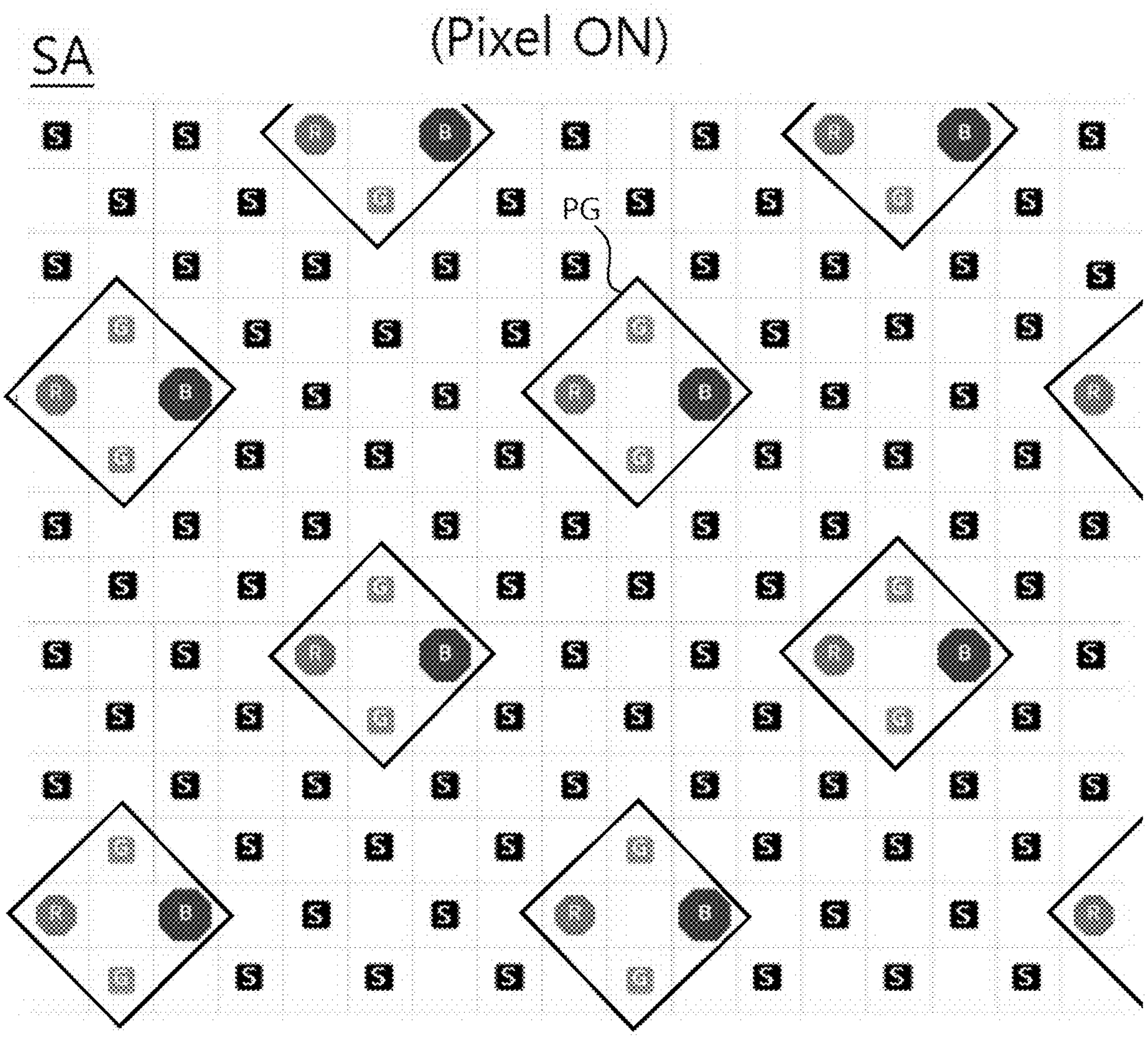

FIGS. 18A and 18B are views illustrating an operation of the second sensing area illustrated in FIG. 17.

Referring to FIG. 18A, the pixels of the second sensing area SA may be in a non-driving state in a power-off state, a standby mode, and a non-driving frame period during low-speed driving. In the non-driving state, the pixels do not emit light. In the non-driving state, in order to reduce power consumption, the photosensors S may not be driven.

Referring to FIG. 18B, in the display mode, the pixels in the second sensing area SA may charge the data voltage of the pixel data and emit light with the luminance according to a gray scale value of the pixel data. Thus, in the display mode, the second sensing area SA may display the input image.

In this way, it may be seen that in the second sensing area SA of the display device to which the fingerprint recognition module is applied, the photosensors S are arranged between the pixel groups PG and the adjacent pixel groups GP, and in the display mode in which the input image displayed, since only the pixels emit light, the pixels are arranged at the low PPI to correspond to a structure of the first sensing area CA in which the light transmitting parts AG are arranged between the pixel group PG and the adjacent pixel groups PG.

Thus, as proposed in the present disclosure, the screen may be divided into the first area including the pixels arranged at the high resolution and the second area including the pixels arranged at the high resolution and the pixels arranged at the low resolution, the first gamma compensation voltage generated by dividing the first reference voltage may be applied to the first area, and the different second gamma compensation voltages generated by dividing the first voltage level and the second voltage level of the second reference voltage according to each resolution may be applied to the second area.

Figure 19:
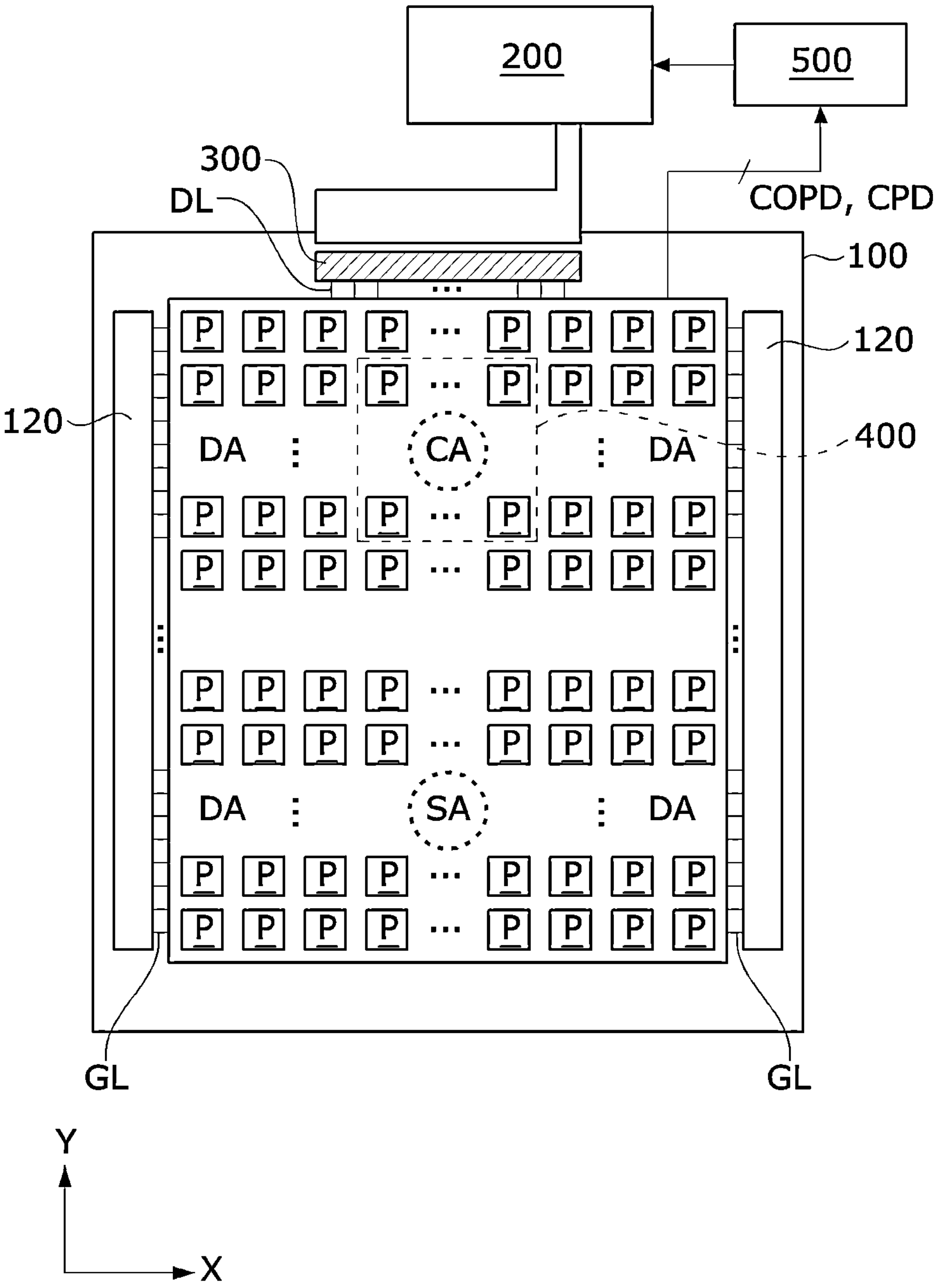
FIG. 19 is a view illustrating a display device to which both the camera module and the fingerprint recognition module are applied according to the embodiment.

FIG. 19 is a view illustrating a display device to which both the camera module and the fingerprint recognition module are applied according to the embodiment.

Referring to FIG. 19, the display device includes the display panel 100 in which the pixel array is arranged on the screen, the display panel drive unit, and the like. The screen on which the input image is reproduced on the display panel 100 includes the display area DA, the first sensing area CA, and the second sensing area SA.

Sub-pixels of each of the display area, the first sensing area CA, and the second sensing area SA include pixel circuits. The pixel circuit may include the drive element that supplies a current to the light emitting element OLED, the plurality of switch elements that sample a threshold voltage of the drive element and switch a current path of the pixel circuit, the capacitor that maintains a gate voltage of the drive element, and the like.

The first sensing area CA includes the light transmitting parts AG arranged between the pixel groups PG and an imaging element module disposed below the first sensing area CA. The imaging element module photoelectrically converts light incident through the first sensing area CA in the imaging mode using the image sensor, converts the pixel data of the image output from the image sensor into digital data, and outputs the captured image data.

The second sensing area SA includes pixels in which the pixel data is written and sensor pixels spaced apart from each other at a predetermined interval with the pixels interposed therebetween. The sensor pixels include photosensors and a photosensor drive circuit that drives the photosensors. The display pixels in the second sensing area SA emit light according to the data voltage of the pixel data in the display mode to display the input data but emit light with high luminance according to the voltage of the light source driving data and are thus driven as light sources in the fingerprint recognition mode.

In this way, different gamma compensation voltages according to resolutions according to the embodiment of the present disclosure can be applied even to the display device to which both the imaging element module and the fingerprint recognition module are applied.

Although the embodiments of the present disclosure have been described in more detail with reference to the accompanying drawings, the present disclosure is not limited thereto and may be embodied in many different forms without departing from the technical concept of the present disclosure. Therefore, the embodiments disclosed in the present disclosure are provided for illustrative purposes only and are not intended to limit the technical concept of the present disclosure. The scope of the technical concept of the present disclosure is not limited thereto. Therefore, it should be understood that the above-described embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A display device comprising:

a substrate including a first area and a second area adjacent to the first area, the first area includes first pixels arranged at a first pixels per inch (PPI) and the second area includes second pixels arranged at a second PPI that is less than the first PPI;

a data line connected to pixels of the first area and the second area;

a gamma compensation voltage generator that divides a reference voltage and outputs a gamma compensation voltage based on the divided reference voltage; and a data driver that converts pixel data into the gamma compensation voltage and outputs a data voltage to the data line, wherein the reference voltage varies between a first voltage level and a second voltage level that is different from the first voltage level in a boundary area between the first area and the second area that share a same data line such that at least one of the second pixels from the second area is applied a data voltage according to the reference voltage having the second voltage level and at least one of the first pixels from the first area that shares the same data line as the at least one of the second pixels is applied a data voltage according to the reference voltage having the first voltage level, a range of the data voltage applied to the second pixels is greater than a range of the data voltage applied to the first pixels.

2. The display device of claim 1, wherein the gamma compensation voltage generator divides the first voltage level of the reference voltage and outputs the gamma compensation voltage while scanning the first pixels arranged in the first area.

3. The display device of claim 2, wherein the gamma compensation voltage generator divides the second voltage level of the reference voltage and outputs the gamma compensation voltage while scanning the second pixels arranged in the second area.

4. The display device of claim 1, wherein the boundary area includes the pixels adjacent to the second pixels arranged in the second area among the first pixels arranged in the first area.

5. The display device of claim 1, wherein the boundary area includes the pixels adjacent to the first pixels arranged in the first area among the second pixels arranged in the second area.

6. The display device of claim 1, wherein the boundary area includes the pixels adjacent to each other among the first pixels arranged in the first area and the second pixels arranged in the second area.

7. The display device of claim 1, wherein each channel of the data driver includes a digital-analog converter, which converts the pixel data into the gamma compensation voltage output from the gamma compensation voltage generator and outputs the data voltage, and an output buffer that is connected to an output node of the digital-analog converter.

8. The display device of claim 1, wherein each of the gamma compensation voltage generator includes:

a first circuitry that divides the reference voltage using a voltage divider circuit and selects, from the divided reference voltages, gamma reference voltages including an uppermost gamma reference voltage and a lowest gamma reference voltage;

a second circuitry that divides the gamma reference voltages and selects the remaining gamma reference voltages from the divided reference voltages; and a third circuitry that divides the gamma reference voltages output from the first circuitry and the second circuitry and outputs gray scale-specific gamma compensation voltages, wherein the first circuitry, the second circuitry, and the third circuitry are integrated in a drive integrated circuit (IC) or the third circuitry is integrated in the drive IC.

9. The display device of claim 1, wherein the second area includes at least one of an area including the second pixels and a camera module and an area including the second pixels and a fingerprint recognition module.

10. A display device comprising:

a substrate including a first area and a second area adjacent to the first area, the first area includes first pixels arranged at a first pixels per inch (PPI) and the second area includes second pixels arranged at a second PPI that is less than the first PPI;

a data line connected to the first pixels of the first area and the second pixels of the second area;

a gamma compensation voltage generator that divides a reference voltage and outputs a gamma compensation voltage based on the divided reference voltage;

a data driver that converts pixel data into the gamma compensation voltage and outputs a data voltage to the data line;

a power supplier that supplies the reference voltage; and a timing controller that generates a reference voltage control signal for controlling the reference voltage to change between a first voltage level and a second voltage level voltage that is different from the first voltage level in a boundary area between the first area and the second area that share a same data line and provides the reference voltage control signal to the power supplier, wherein at least one of the second pixels from the second area is applied a data voltage according to the reference voltage having the second voltage level and at least one of the first pixels from the first area that shares the same data line as the at least one of the second pixels is applied a data voltage according to the reference voltage having the first voltage level, a range of the data voltage applied to the second pixels is greater than a range of the data voltage applied to the first pixels.

11. The display device of claim 10, wherein the gamma compensation voltage generator divides the first voltage level of the reference voltage and outputs the gamma compensation voltage while scanning the first pixels arranged in the first area.

12. The display device of claim 11, wherein the gamma compensation voltage generator divides the second voltage level of the reference voltage and outputs the gamma compensation voltage while scanning the second pixels arranged in the second area.

13. The display device of claim 10, wherein the boundary area includes the pixels adjacent to the second pixels arranged in the second area among the first pixels arranged in the first area.

14. The display device of claim 10, wherein the boundary area includes the pixels adjacent to the first pixels arranged in the first area among the second pixels arranged in the second area.

15. The display device of claim 10, wherein the boundary area includes the pixels adjacent to each other among the first pixels arranged in the first area and the second pixels arranged in the second area.

16. The display device of claim 10, wherein each channel of the data driver includes a digital-analog converter, which converts the pixel data into the gamma compensation voltage output from the gamma compensation voltage generator and outputs the data voltage, and an output buffer that is connected to an output node of the digital-analog converter.

17. The display device of claim 10, wherein each of the gamma compensation voltage generator includes:

a first circuitry that divides the reference voltage using a voltage divider circuit and selects, from the divided reference voltages, gamma reference voltages including an uppermost gamma reference voltage and a lowest gamma reference voltage;

a second circuitry that divides the gamma reference voltages and selects the remaining gamma reference voltages from the divided reference voltages; and a third circuitry that divides the gamma reference voltages output from the first circuitry and the second circuitry and outputs gray scale-specific gamma compensation voltages, wherein the first circuitry, the second circuitry, and the third circuitry are integrated in a drive integrated circuit (IC) or the third circuitry is integrated in the drive IC.

18. The display device of claim 10, wherein the second area includes at least one of an area including the second pixels and a camera module and an area including the second pixels and a fingerprint recognition module.

19. A display device comprising:

a substrate including a first area and a second area adjacent to the first area, the first area includes first pixels arranged at a first pixels per inch (PPI) and the second area includes second pixels arranged at a second PPI that is less than the first PPI;

a data line connected to pixels of the first area and the second area;

a gamma compensation voltage generator that divides a reference voltage and outputs a gamma compensation voltage based on the divided reference voltage; and a data driver that converts pixel data into the gamma compensation voltage and outputs a data voltage to the data line, wherein the reference voltage varies between a first voltage level and a second voltage level that is different from the first voltage level in a boundary area between the first area and the second area that share a same data line such that at least one of the second pixels from the second area emits light according to the reference voltage having the second voltage level and at least one of the first pixels from the first area that shares the same data line as the at least one of the second pixels emits light according to the reference voltage having the first voltage level, the light emitted by the at least one of the second pixels having a luminance that is greater than the light emitted by the at least one of the first pixels in the first area.

* * * * *